United States Patent
Kasahara et al.

[11] Patent Number: 5,936,679
[45] Date of Patent: Aug. 10, 1999

[54] TELEVISION RECEIVER HAVING MULTIPLE COMMUNICATION CAPABILITIES

[75] Inventors: Yasuhiro Kasahara, Yokohama; Tadashi Sube, Ohme; Tadahiro Yamaguchi, Fucyu; Yukiko Iwama, Kokubunji; Masahide Aoki, Iruma, all of Japan

[73] Assignee: Hitachi, Ltd., Tokyo, Japan

[21] Appl. No.: 08/697,191

[22] Filed: Aug. 20, 1996

[30] Foreign Application Priority Data

Aug. 24, 1995 [JP] Japan .................................. 7-216325

[51] Int. Cl.<sup>6</sup> .............................. H04N 7/18; H04N 5/14
[52] U.S. Cl. ...................... 348/553; 348/552; 348/563; 348/14; 348/725
[58] Field of Search .................................. 348/567, 552, 348/553, 563, 15, 156, 152, 14, 564, 473, 484, 725, 738, 565, 13; H04N 7/18, 5/14

[56] References Cited

U.S. PATENT DOCUMENTS

| | | | |
|---|---|---|---|
| 4,427,847 | 1/1984 | Hofmann et al. ..................... | 179/2 TV |
| 4,959,713 | 9/1990 | Morotomi et al. ...................... | 358/108 |
| 4,982,279 | 1/1991 | Ishii et al. .............................. | 358/160 |
| 5,621,482 | 4/1997 | Gardner et al. .......................... | 348/553 |
| 5,680,177 | 10/1997 | Abe ......................................... | 348/564 |

*Primary Examiner*—John K. Peng
*Assistant Examiner*—Jean W. Désir
*Attorney, Agent, or Firm*—Kenyon & Kenyon

[57] ABSTRACT

The present invention makes a variety of improvements on the conventional television receiver to enhance the home communication capability thereof, thereby making the television receiver available as an information terminal apparatus for household use. The novel television receiver that receives a television signal to display a television image on screen comprising: a memory; a microphone through which voice information is entered externally; writing section for writing at least one piece of the voice information entered through the microphone and additional information associated with the at least one piece of voice information into the memory; and a display device for reproducing the at least one piece of voice information stored in the memory and outputting the reproduced voice information through a speaker and displaying the additional information associated with the at least one piece of voice information onto the screen. The memory stores as a message the voice information entered through the microphone. The stored message is reproduced according to an externally given instruction and the reproduction is outputted to a speaker to transmit the message to other persons with ease.

15 Claims, 28 Drawing Sheets

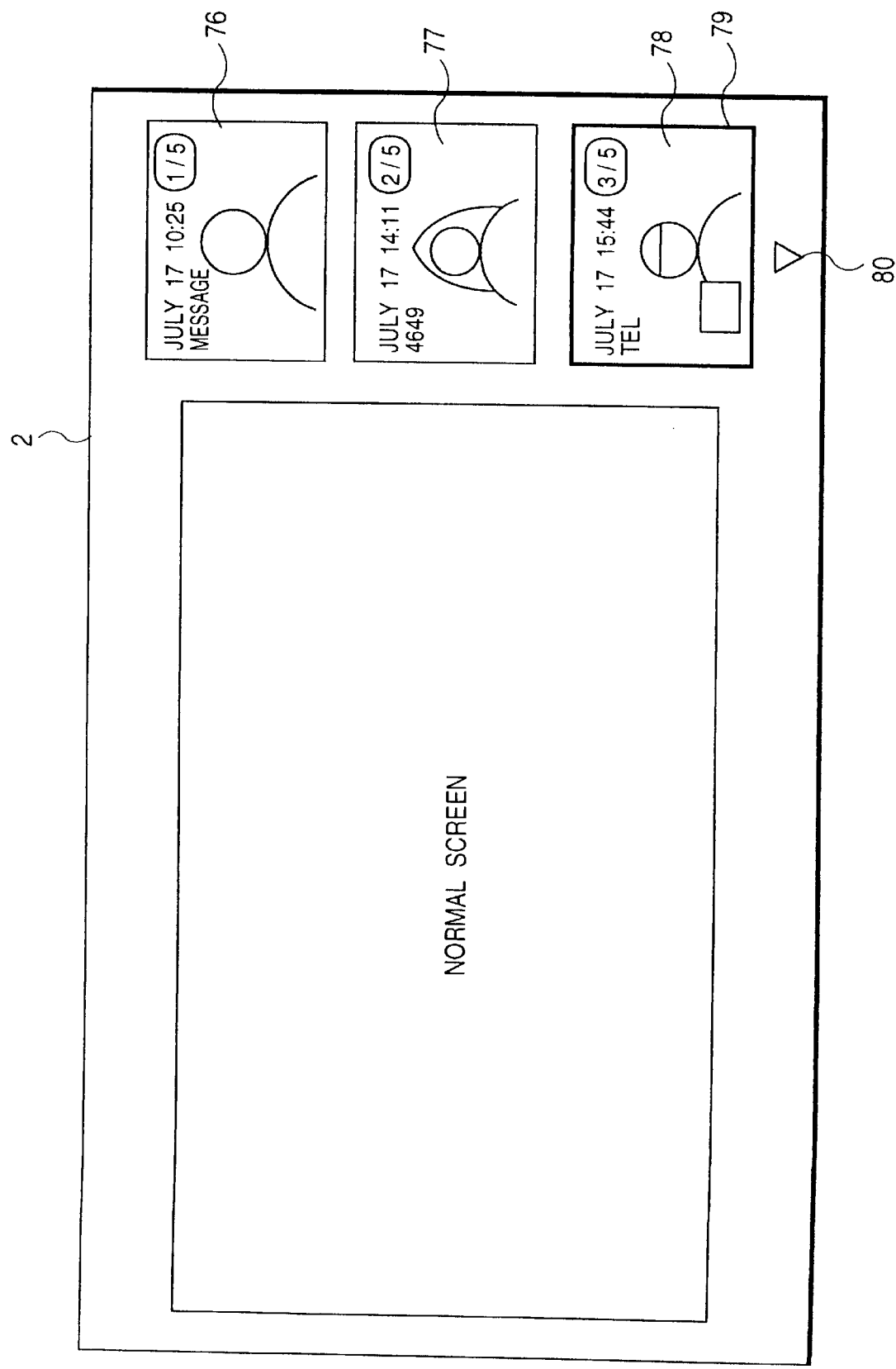

TELEVISION RECEIVER HAVING MULTIPLE COMMUNICATION CAPABILITIES

BACKGROUND OF THE INVENTION

This invention relates to a television receiver that is available as an information terminal apparatus for household use.

Recently, in addition to their intrinsic capability of receiving television programs, television receivers are being required, as their permeation has reached saturation, to provide home communication capabilities that allow the television receivers to be used as household information terminals. One of these additional capabilities has been implemented on some television receivers in the form of a voice recording/playback system that records or stores a voice message to be played back as required. Recording or storing and playing back voice information is supported by the technology that is used on a telephone apparatus of a type having automatic answering capability.

However, these conventional technologies provide only the message transmitting capability as mentioned above for providing home communication with others, thereby limiting full usage of television receivers as home communication apparatuses.

SUMMARY OF THE INVENTION

It is therefore an object of the present invention to provide a television receiver that enhances usage of the same as a communication apparatus as required by the user.

In carrying out the invention and according to a first aspect thereof, there is provided a television receiver comprising a memory device and a microphone through which voice information is entered externally wherein at least one piece of voice information entered through the microphone and additional information associated with the voice information are written into the memory device to be appropriately reproduced according to a user instruction.

In carrying out the invention and according to a second aspect thereof, there is provided a television receiver comprising a memory device, a microphone through which voice information is externally entered, a video camera through which image information is externally entered, a writing device for writing the voice information entered through the microphone and the image information entered through the video camera at the time the voice information is entered to the memory device in an interrelated manner, and a display device for reproducing the voice information stored in the memory device according to an externally given instruction to output the reproduced voice signal through a speaker and reproducing the image information corresponding to the voice information, stored in the memory device, to display the reproduced image information on the screen.

In carrying out the invention and according to a third aspect thereof, there is provided a television receiver which has a microphone on a remote controller wherein voice information entered through the microphone is stored in a memory device provided in the television receiver to be appropriately reproduced according to a user instruction.

In carrying out the invention and according to a fourth aspect thereof, there is provided a television receiver wherein, in response to an operation performed on a calling switch installed on an intercommunicating system, a video image coming from a video camera installed on the intercommunicating system is displayed in one area on a screen on which the television image is displayed and voice information coming from a microphone installed on the intercommunicating system is outputted to a speaker.

In carrying out the invention and according to a fifth aspect thereof, there is provided a television receiver wherein, in response to an operation performed on a calling switch installed on an intercommunicating system, image information coming from a video camera installed on the intercommunicating system and voice information coming from a microphone installed on the intercommunicating system are stored in a memory device in an interrelated manner to be appropriately reproduced by a user instruction.

In carrying out the invention and according to a sixth aspect thereof, there is provided a television receiver wherein the television receiver is connected with a telephone line, information coming from a telephone apparatus transmitted over the telephone line is stored in a memory device, and the stored information is displayed on screen according to a user instruction. The information coming from the telephone apparatus is a code which represents a value entered in to the telephone apparatus. A text predetermined for the code may also displayed on screen as image information.

The above-mentioned novel constitutions allow the user to store as messages the information coming from a variety of information sources including a television receiver, a microphone provided on a remote controller, a microphone provided on an intercommunicating system, a TV camera, a tone-dialing telephone apparatus, and a TV telephone and reproduce the stored information as required. Consequently, the present invention allows the user to utilize a variety of information sources when transmitting a message to others via the television receiver.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 27 shows an example of messages read in the order in which the same were entered.

DETAILED DESCRIPTION OF THE PREFERRED EMBODIMENTS

This invention will be described in further detail by way of example with reference to the accompanying drawings.

The present invention provides a message capability for transmitting a message, an intercommunicating system (namely, an intercom), a code message capability, and a television telephone capability and allows the user to select each of the modes for using these capabilities.

Figure 1:
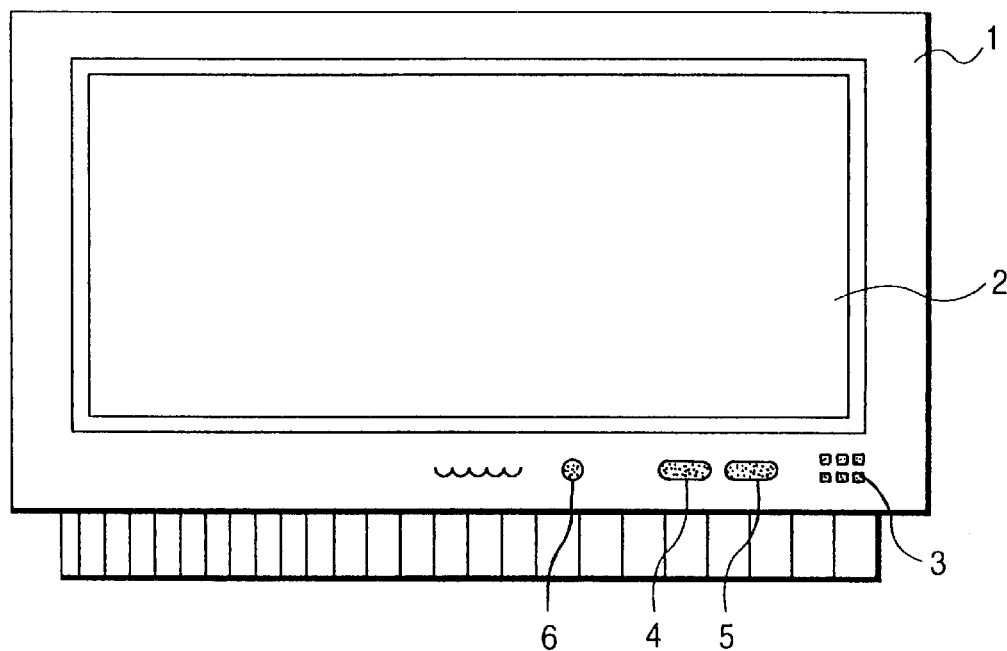
FIG. 1 is an elevational view illustrating a television receiver practiced as a first preferred embodiment of the invention.

The television receiver practiced as the first preferred embodiment of the present invention provides the message capability, the intercom capability, and the code message capability and has a variety of operator buttons on an operator panel on the front side of a television receiver main 1 like a conventional television receiver as shown in FIG. 1. Further, the first embodiment incorporates a voice memory and has a microphone 3, a record button 4, a playback button 5, and a message LED (Light Emitting Diode) 6.

In the message mode in which the message capability is used, a message can be entered through the microphone 3 by operating the record button 4. A voice signal representative of the entered message is stored in the voice memory, upon which the message LED 6 goes on to indicate that message has come. When such a message is stored in the memory, the message is read from the memory by operating the playback 5 to be outputted from a speaker.

In the intercom mode in which the intercommunicating system is used, an image coming from a video camera installed at a house entrance for example is displayed as a sub screen on a display screen 2 of the television receiver main 1 and a talk can be made with a visitor for example through the microphone 3. At the same time, this image and voice are stored to be reproduced later.

In the code message mode in which the code message capability is used, a message coming from the outside via a telephone line for example is stored in the voice memory to be reproduced through the speaker by operating the playback button 5.

Figure 2:
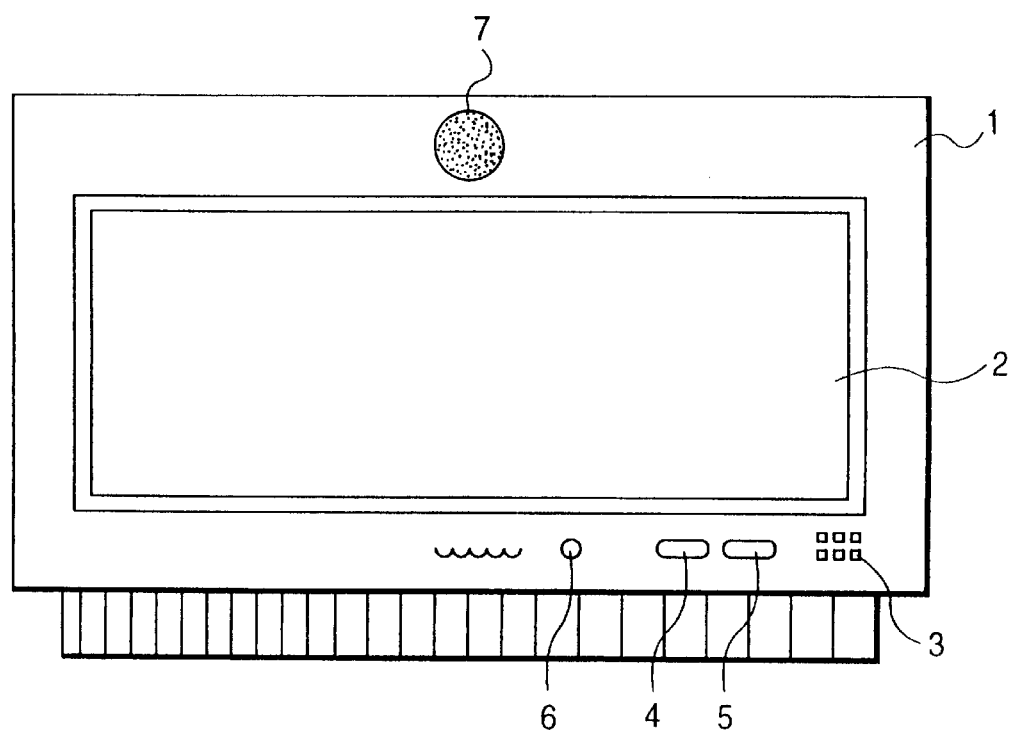
FIG. 2 is elevational view illustrating the television receiver practiced as a second preferred embodiment of the invention.

The second preferred embodiment of the invention provides a video camera 7 on the television receiver main 1 as shown in FIG. 2 and incorporates an image memory, by which the TV telephone mode in which television telephone capability is used can be set.

In the TV telephone mode, an image of the other party is shown on the display screen as a main screen and an own image is shown on the display screen 2 as a sub screen. The talk with the other party is performed through the microphone 3.

In addition, in the second embodiment, in the message mode, an image of the face of the message sending person is also entered through the video camera 7 during message entry to be stored in the image memory. When reproducing this message, the image is reproduced from the image memory to be shown on the display screen 2 as a sub screen.

Figure 3:
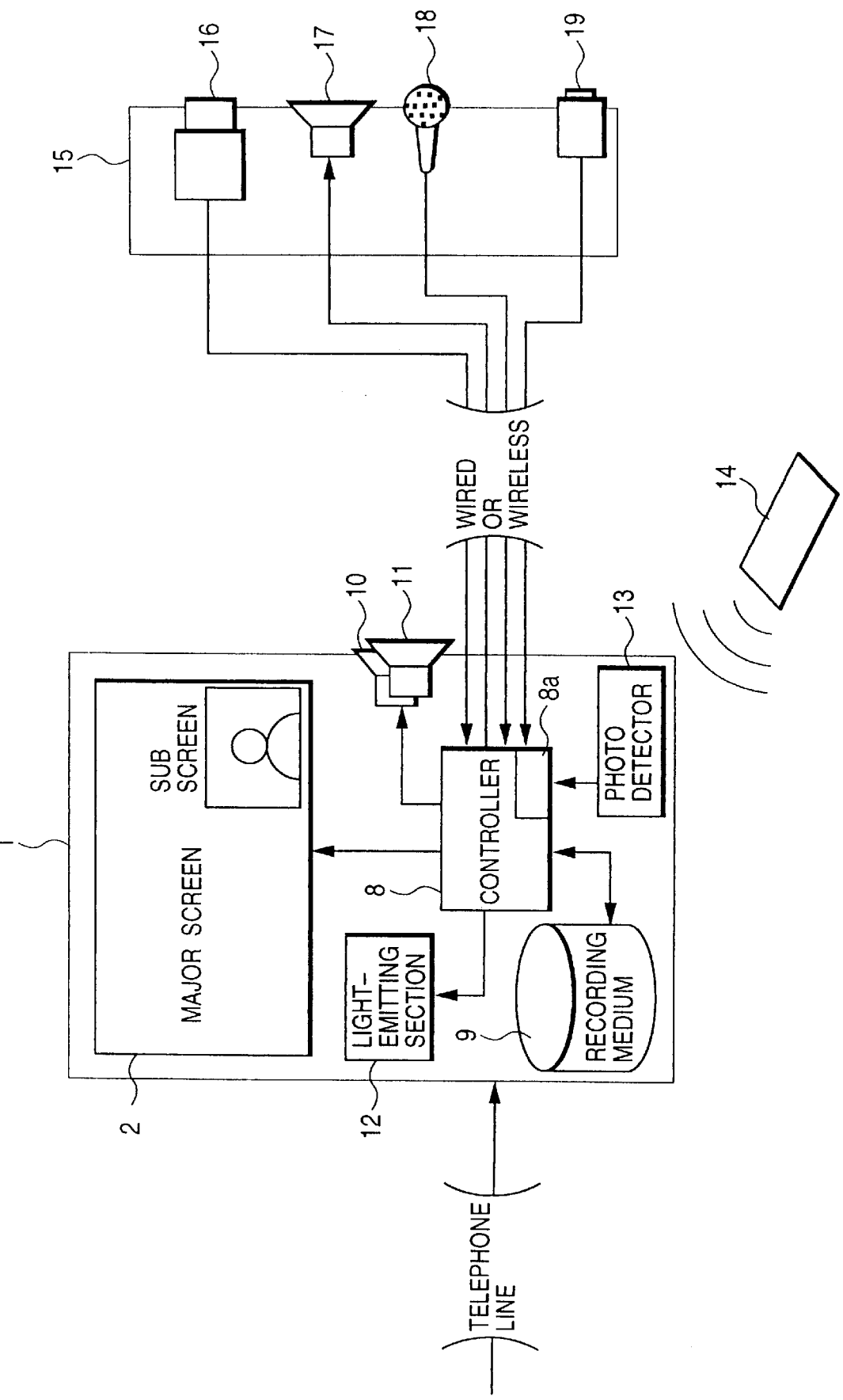
FIG. 3 is a block diagram illustrating a constitution of the embodiments of FIGS. 1 and 2.

FIG. 3 shows a block diagram of the constitution of the second embodiment wherein reference numeral 8 indicates a controller, reference numeral 8a indicates a timer, reference numeral 9 indicates recording medium, reference numerals 10 and 11 indicate speakers, reference numeral 12 indicates a light emitting section, reference numeral 13 indicates a photo detector, reference numeral 14 indicates a remote controller, reference numeral 15 indicates the intercommunicating system (the intercom), reference numeral 16 indicates a video camera, reference numeral 17 indicate a speaker, reference numeral 18 indicates a microphone, and reference numeral 19 indicates a calling switch. With reference to FIGS. 1 and 2, similar components are denoted by the same reference numerals.

In FIG. 3, the television receiver main 1 has the light emitting section 12 and the recording medium 9. The controller 8 controls TV program reception, each of the above-mentioned, and has the timer 8a for generating time and date information for example. The recording medium 9 records a message in each of the above-mentioned modes. The light emitting section 12 turns on the message LED 6 of FIG. 2. For the recording medium 9, appropriate memory means and recording medium such as a semiconductor memory device and a hard disk may be used.

The television receiver main 1 can receive a control signal coming from the remote controller 14 at the light emitting section 13 as well as a voice signal to be described later. The television receiver is also connected to the intercom 15 in a wired or wireless manner and to a telephone line. In the second embodiment of FIG. 2, the video camera 7, not shown, is provided. Display of an output image of the video camera on the display screen 2 and the recording and playback operations on the recording medium 9 are also controlled by the controller 8.

In what follows, each of the above-mentioned modes will be described. It should be noted that different remote controllers 14 are used for different modes.

(1) Message mode

Figure 4:
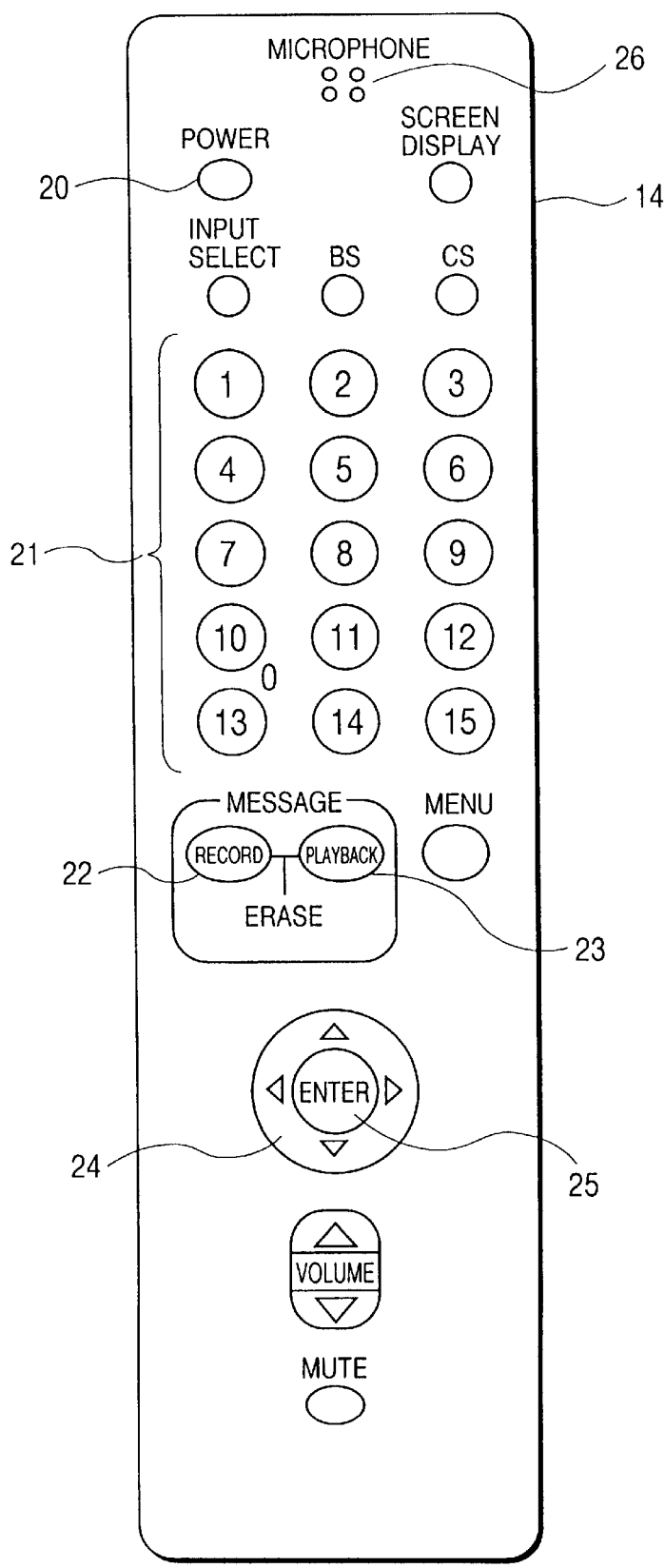
FIG. 4 is a top view illustrating a remote controller for use in the message mode practiced as one embodiment of the invention.

FIG. 4 shows a top view of an example of a remote controller 14 for use in the message mode in the first and second embodiments.

In FIG. 4, the remote controller 14 has a record button 22, a playback button 23, a cursor key 24, an enter button 25, and a microphone 26 in addition to usually provided power button 20 and numeric keys 21. Through the microphone 26, the input of a message from the remote controller 14 to the television receiver main 1 in the message mode and the talk with the other party can be performed.

The record button 22 and the playback button 23 are used to operate the recording medium 9 incorporated in the television receiver main 1. The cursor key 24 is used to specify a desired thing displayed on the display screen 2. The enter button 25 is used to establish the specification made by the cursor key 24. It should be noted that operating the horizontally arranged triangular markers moves the cursor horizontally while operating the vertically arranged triangular markers moves the cursor vertically.

In the message mode, a message is entered through the microphone 3 of the television receiver main 1 or the microphone 26 of the remote controller 14; however, there is a difference between the embodiment of FIG. 1 and the embodiment of FIG. 2. Namely, in the first embodiment, only a voice message is recorded in the recording medium 9 incorporated in the television receiver main 1, while, in the second embodiment, an image coming from the video camera 7 (FIG. 2) is also recorded. The case of the first embodiment is herein called the voice message mode and the case of the second embodiment is called the voice/image message mode. These modes are generically referred to as the message mode.

The operations to be described below are performed by operating the remote controller 14 (FIG. 4). It will be apparent that, if the television receiver main 1 has a similar button, similar operations can be performed by such a button.

(i) The voice message mode

Figure 5:
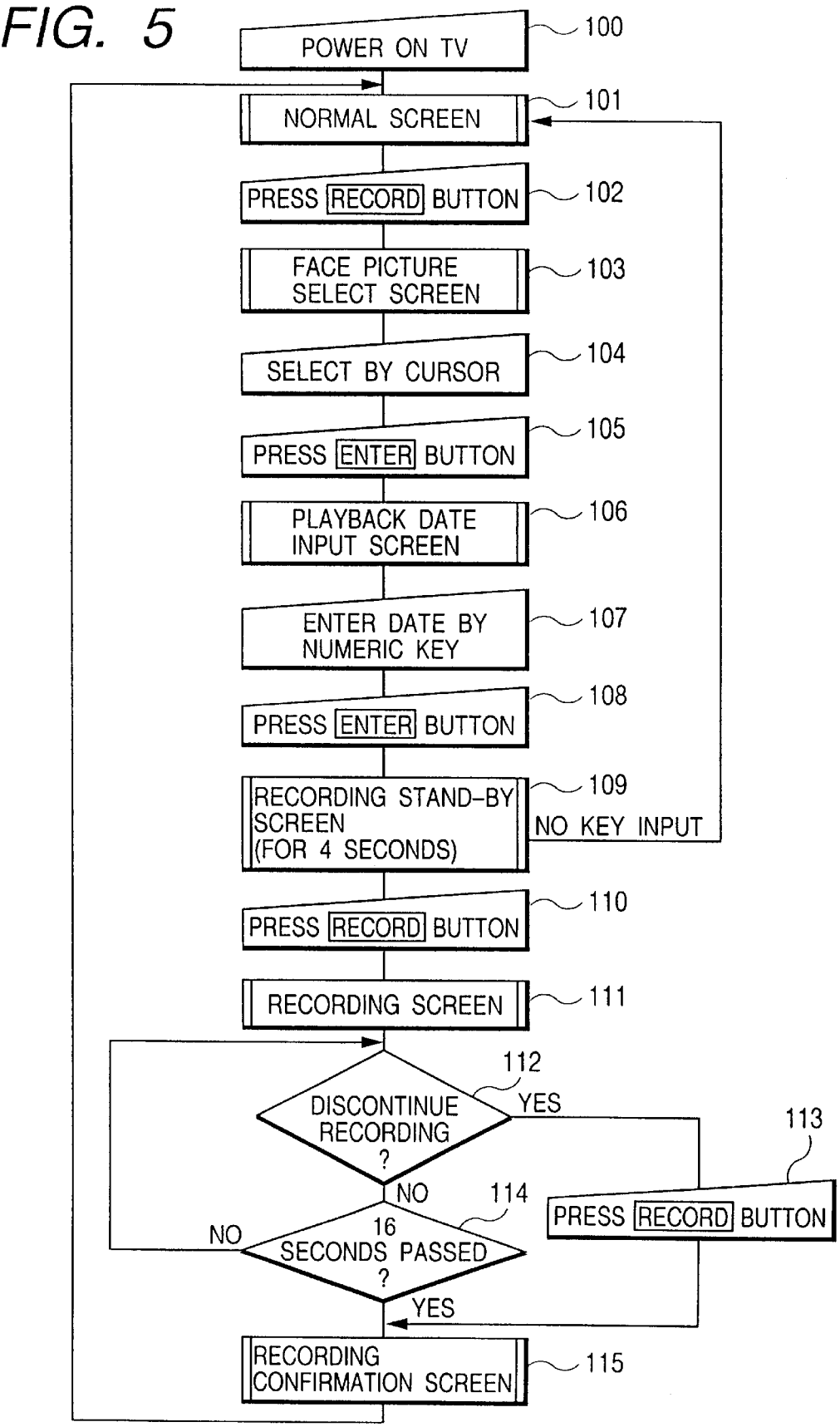
FIG. 5 is a flowchart indicating operations in the message mode in the embodiment of FIG. 1.

FIG. 5 shows the flowchart describing the operations to be performed in the voice message mode. FIG. 6 shows examples of the display on the display screen 2 (FIG. 1) for these operations. In what follows, the operations in the message mode will be described with reference to FIGS. 1 and 4.

Referring to FIG. 5, when the power button of the remote controller 14 is turned on (step 100), the power to the television receiver main 1 is turned on, upon which only an image of a television program received (hereinafter referred to as a received image) is shown on the display screen 2. This is called a normal screen hereinafter (step 101).

In this state, operating the record button 22 of the remote controller 14 (step 102) displays a picture select screen as shown in FIG. 6 (a) on the received image (step 103). This picture select screen contains icons 27 representative of family members for example who leave a message and a text saying "Select a face with the cursor and press the enter button" for example.

When a person who leaves a message specifies a face icon representing that person with the cursor 27 (step 104) and operates the enter button (step 105), a playback date input screen as shown in FIG. 6 (b) is displayed (step 106). This screen displays the picture 27 representing the face picture selected in the screen of FIG. 6 (a), a character string 28 for specifying playback date, and a text "Enter a specified date with numeric keys and press the enter key."

Figure 6A:
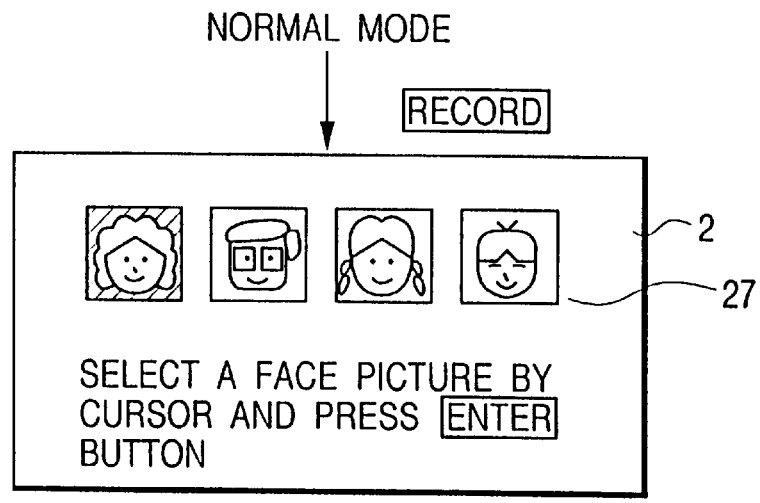
FIG. 6 shows display screens in the states indicated by the flowchart of FIG. 5.
Figure 6B:
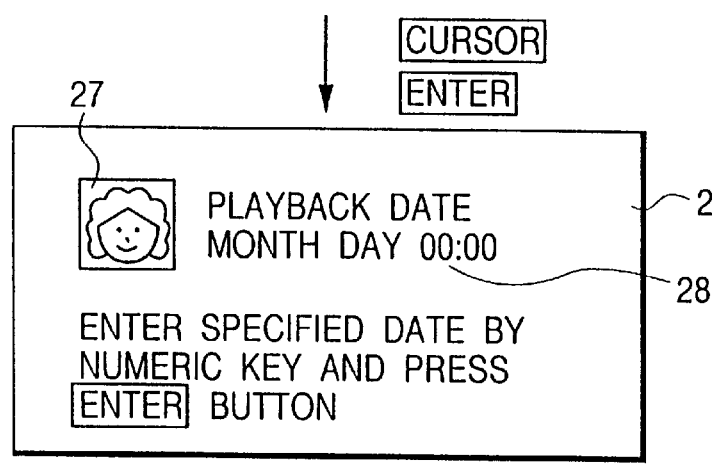
Figure 6C:
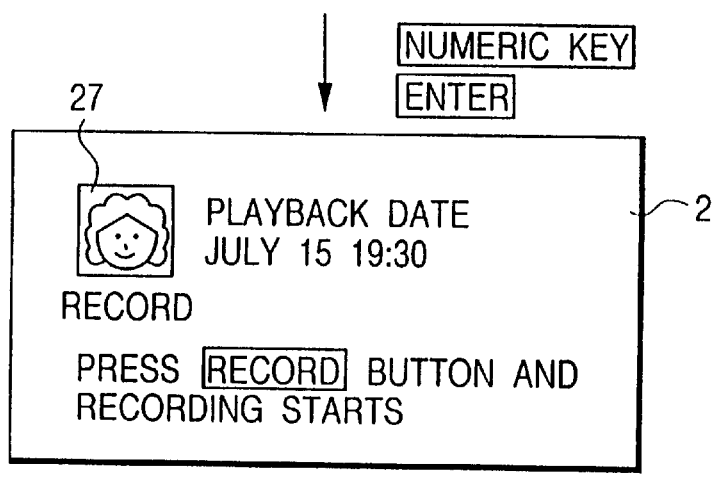
Figure 6D:
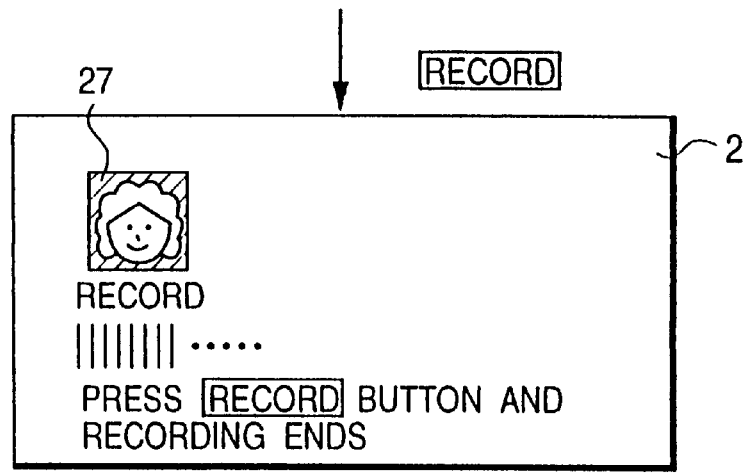
Figure 6E:
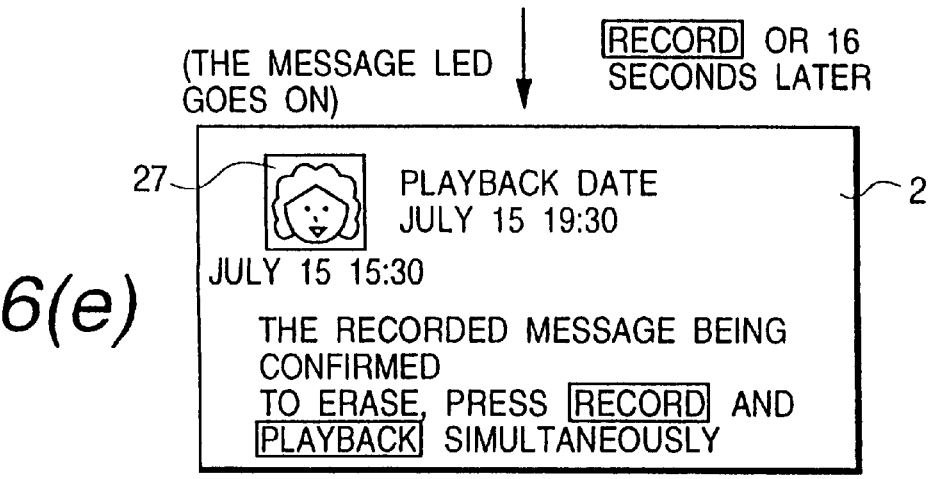
Figure 6F:
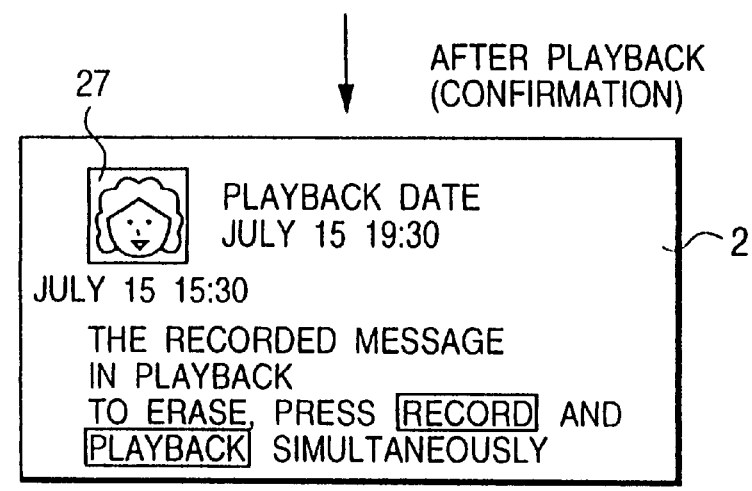

According to the instruction, operating the numeric keys 21 of the remote controller 14 to set the playback date to "July 15, 19:30" for example (step 107) and then operating the enter button 25 (step 108) displays a recording standby screen showing a text "Press the record button to start recording" as shown in FIG. 6(c) (step 109). This screen is displayed for four seconds as a standby period for example, during which, if the record button 22 of the remote controller 14 is not operated, the process goes back to step 101 interpreting that no message is left, upon which the normal screen is displayed.

If the record button 22 of the remote controller 14 is pressed before the passing of the standby period of four seconds (step 110), a message can be entered through the microphone 3 of the television receiver main 1 or the microphone 26 of the remote controller 14. Meanwhile, the display screen 2 displays a recording screen of FIG. 6 (d) showing the selected face picture 27, the word "record" below the picture, and the instruction "Press the record button to end" (step 111).

If it is desired to discontinue the entry of the message (step 112), when the record button 22 of the remote controller 14 is operated again (step 113) or one message recordable period, 16 seconds for example, has passed (step 114), the recording is stopped and a confirmation screen as shown in FIG. 6 (e) is displayed (step 115).

This confirmation screen shows the selected picture 27, the date on which the message was entered according to the date information coming from the timer 8a (July 15 15:30 herein), the playback date "July 15 19:30," and the text "The recorded message being confirmed. To erase, press the record and playback simultaneously." At the same time, the entered message is reproduced to be outputted from the speaker 3 of the television receiver main 1 or the microphone 26 of the remote controller 14. At this moment, the picture 27 is displayed with its mouth moving as if speaking a message, by way of example.

This allows the user to confirm the message for example. When the message has been reproduced, the process goes back to step 101 in which the normal screen is displayed. The controller 8 drives the light emitting section 12 (FIG. 3) to turn on the message LED 6, thereby indicating that there is a message.

To cancel an entered message, the record button 22 and the playback button 23 on the remote controller 14 may be pressed simultaneously as shown in the recording confirmation screen of FIG. 6 (e) during confirmation of the message in step 115.

Thus, if a message has been entered with its playback date specified, the date information of the timer 8a is compared with the specified date. When the specified date (July 15 19:30 in the above-mentioned example) has come, the television receiver main 1 is powered on regardless of whether the power to the same is set or not (obviously, the power cord of the television receiver is plugged into the receptacle). And a message playback screen similar to the recording standby screen is displayed on the received image as shown in FIG. 6 (f). At the same time, the message is reproduced from the voice memory to be outputted from the speaker 3 of the television receiver main 1 or the microphone 26 of the remote controller 14. In this message playback screen, the recording date captured at recording from the timer 8a is also displayed below the picture 27, allowing the user to know when the message was left.

Thus, the user may know who left the message and when. And, if the playback date is set beforehand, the party who left the message can transmit the message to the other party even if the other party is not watching a television program.

It should be noted that, if the record button 22 of the remote controller 14 is operated without specifying playback date during display of the playback date input screen of FIG. 6 (*b*) (step 110), it is assumed that no playback date has been specified, in which the message can also be reproduced as will be described.

It should also be noted that a plurality of messages can be recorded; if each of the messages is specified with a playback date, the messages are automatically reproduced as described above.

(ii) Voice/image message mode

Figure 7:
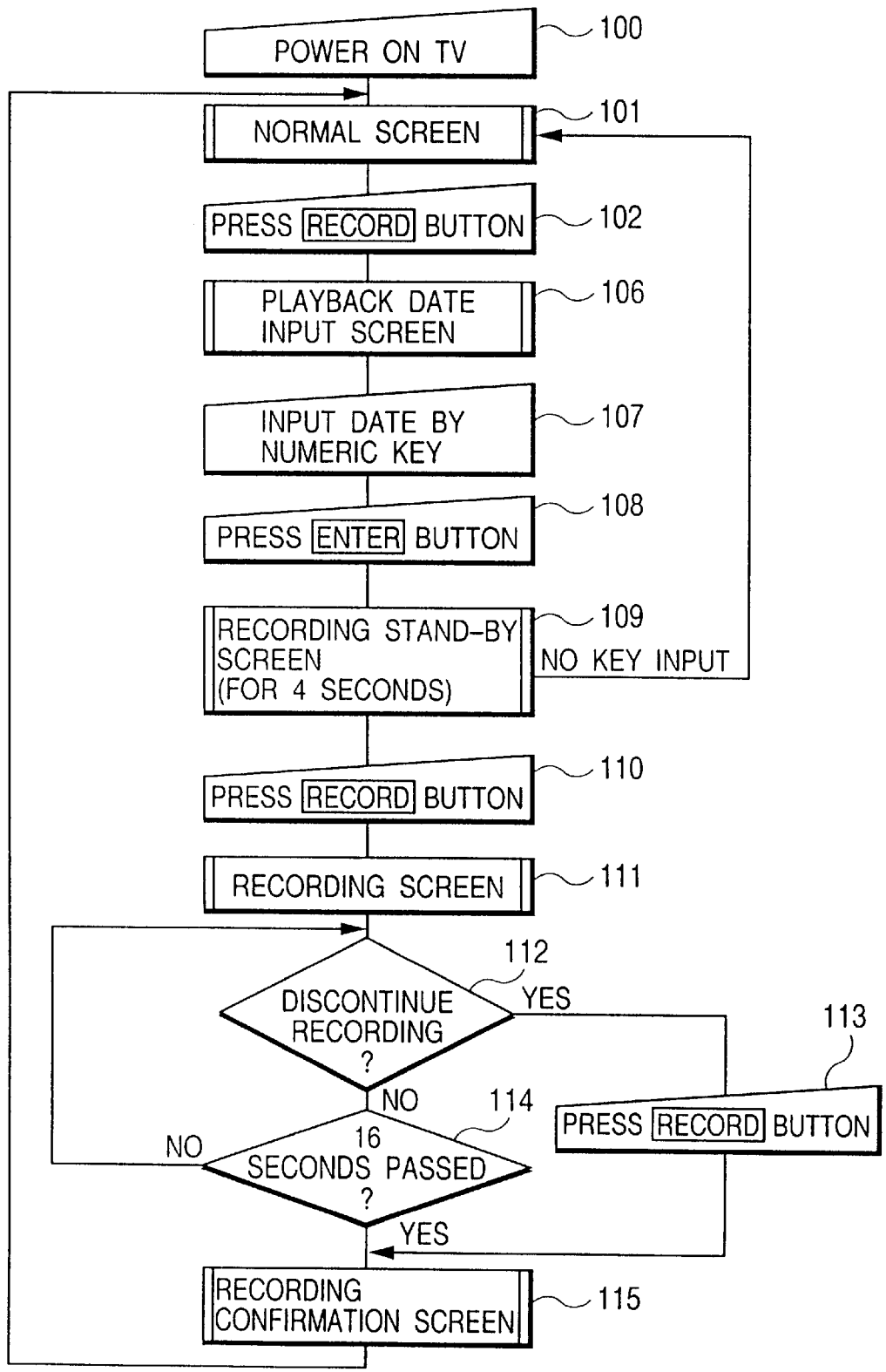
FIG. 7 is a flowchart indicating operations in the message mode of the embodiment of FIG. 2.
Figure 8A:
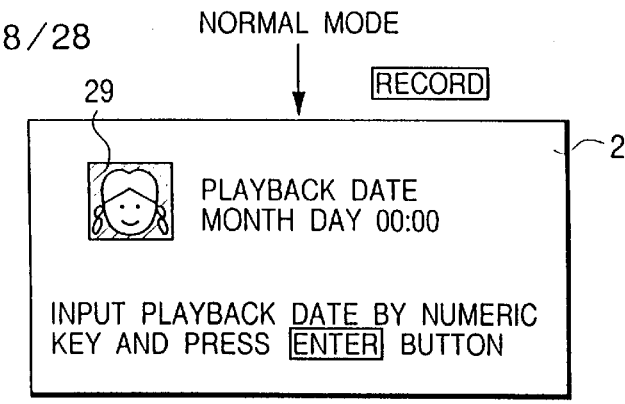
FIG. 8 shows display screens in the states indicated by the flowchart of FIG. 7.
Figure 8B:
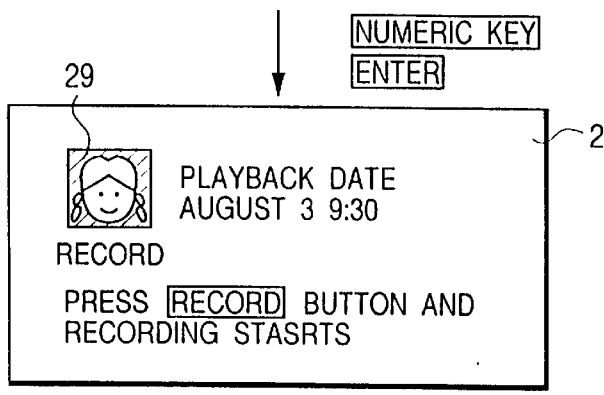
Figure 8C:
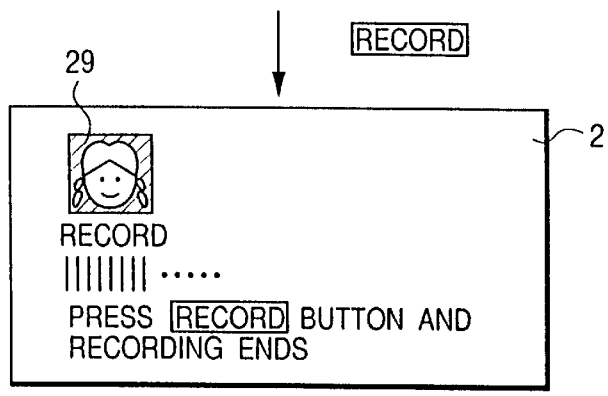
Figure 8D:
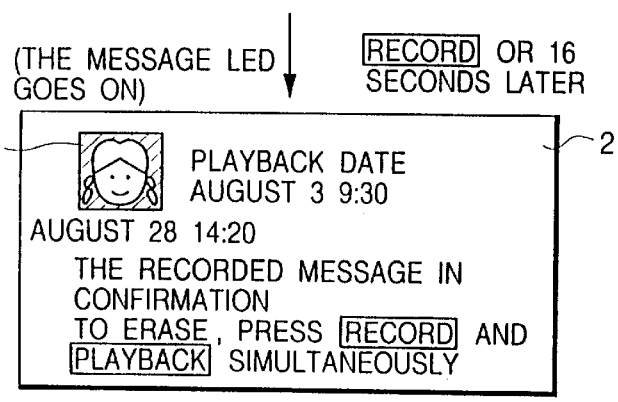

This mode is performed in the second embodiment shown in FIG. 2. FIG. 7 shows a flowchart indicating the operations to be performed in the voice/image message mode. FIG. 8 shows display examples of the display screen 2 (FIG. 2) of these operations, which will be described with reference to FIGS. 2 and 4.

The flowchart of FIG. 7 is generally similar to the flowchart of FIG. 5 except that the former has no steps 103 through 105. Steps 103 through 105 of FIG. 5 are select a picture in the picture select screen of FIG. 6 (*a*), which are made unnecessary in the second embodiment. Instead, the second embodiment uses an image coming from the video camera 7 of FIG. 2.

Referring to FIG. 7, when the record button 22 of the remote controller 14 is turned on (step 100), the television receiver main 1 is powered on, upon which the normal screen is displayed in which only the received image is displayed on the display screen 2 (step 101).

When the record button 22 of the remote controller 14 is operated in this state (step 102), the playback date input screen of FIG. 8 (*a*) is displayed on the received image (step 106). In this playback date input screen, the face of the person who leaves a message is displayed in animation 29 as taken by the video camera 7, the other portions of the screen being the same as those in the playback date input screen of FIG. 6 (*b*). Namely, instead of the picture 27 in the playback date input screen of FIG. 6 (*b*), the animation 29 is displayed.

When the desired playback date is determined on the playback date input screen of FIG. 8 (*a*) (steps 107 and 108), a recording standby screen of FIG. 8 (*b*) appears. When the record button 22 of the remote controller 14 is pressed within the four-second standby period, the message recording in the recording medium 9 (FIG. 3) and the recording of the image coming from the video camera 7 start, upon which a recording screen of FIG. 8 (*c*) appears (step 111).

Then, when the record button 22 is operated within 16 seconds after the start of recording to discontinue the messaging (steps 112 and 113) or when 16 seconds have passed since the start of recording (step 114), the message LED (FIG. 2) goes on and a recording confirmation screen of FIG. 8 (*d*) appears (step 115). This recording confirmation screen is also generally similar to the recording confirmation screen of FIG. 6(*c*) except for displaying of the animation 29 recorded on the recording medium 9 instead of the still picture.

When the confirmation of the contents of the recording is complete, the process goes back to step 101 to display the normal screen. At this moment, in FIG. 3, the controller 8 drives the light emitting section 12 to turn on the message LED 6.

Thus, unlike the first embodiment, the second embodiment displays in animation the person who left a message, so that the person becomes more obvious and the behavior of the person can be known for example.

It should be noted that the second embodiment can also be constituted such that a plurality of messages are recorded. For the image memory, an appropriate memory device such as a semiconductor memory device can be used.

(iii) Message playback

In what follows, the reproduction of the message recorded as described above will be described with reference to FIGS. 9 and 10. It should be noted that the playback of the message with a playback date specified has been described above and therefore will be omitted from the following description. In what follows, the description will be made without making distinction between the embodiments of FIG. 1 and FIG. 2, those portions which are characteristic to each embodiment being described as appropriately.

Figure 9:
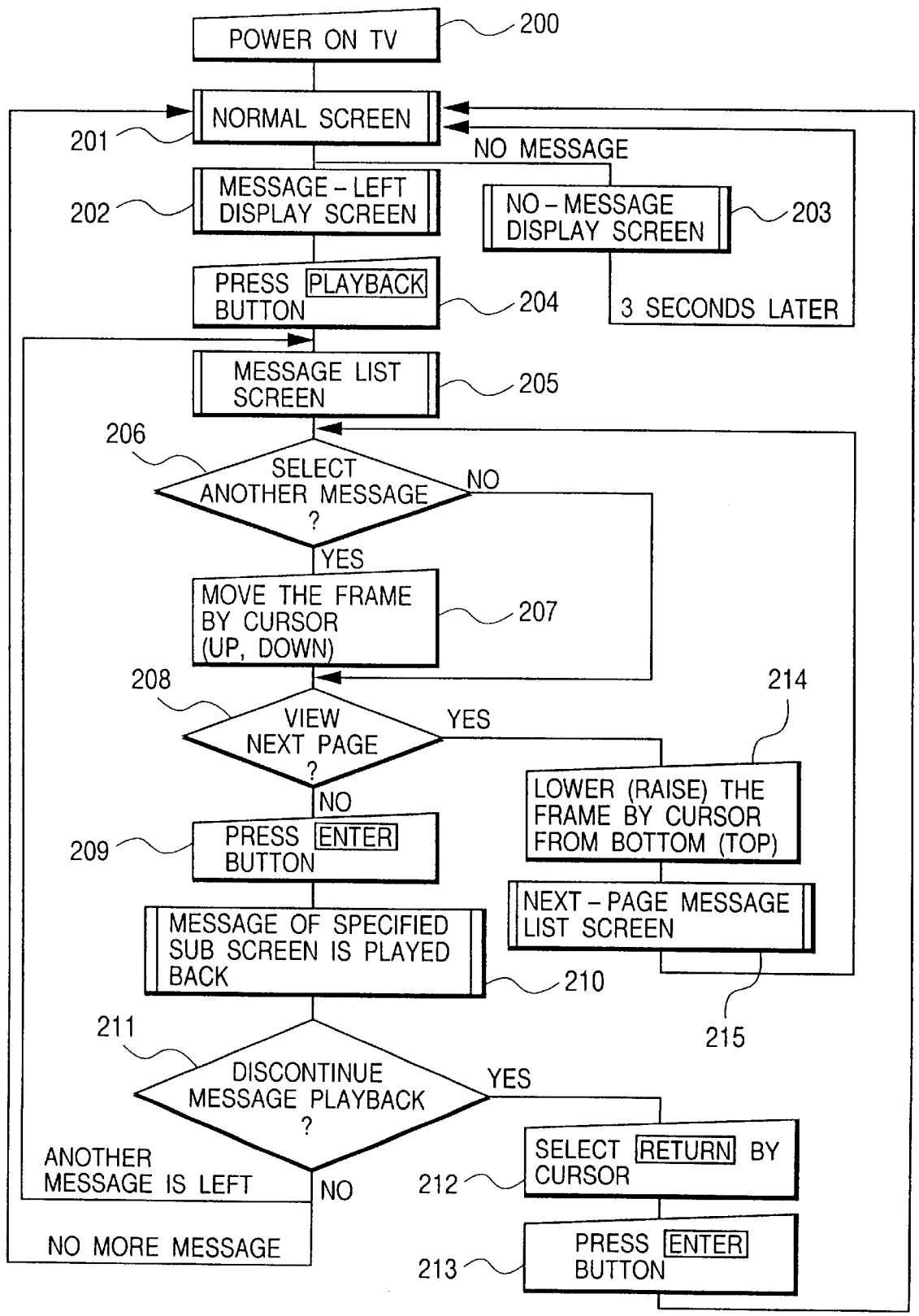
FIG. 9 is a flowchart indicating a message reproducing operation in the embodiments of FIGS. 1 and 2.
Figure 10A:
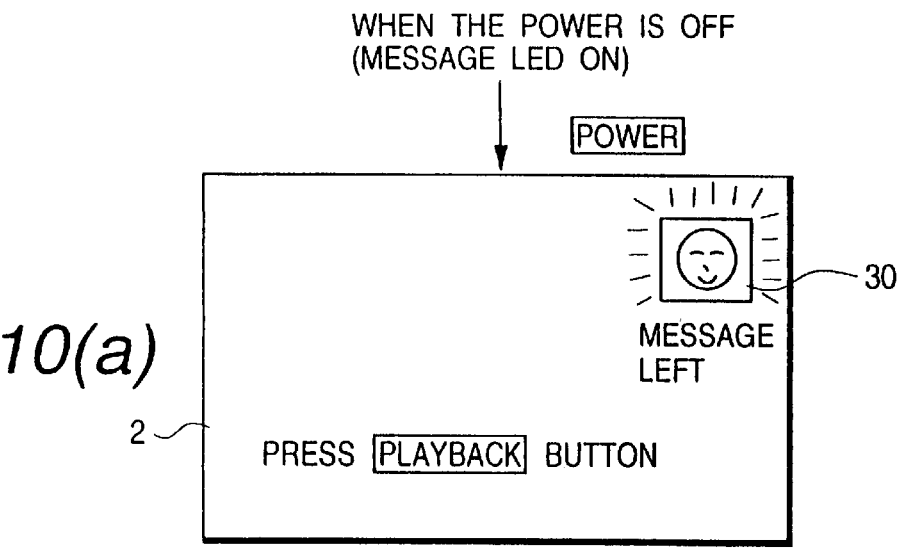
FIG. 10 shows display screens in the states indicated by the flowchart of FIG. 9.
Figure 10B:
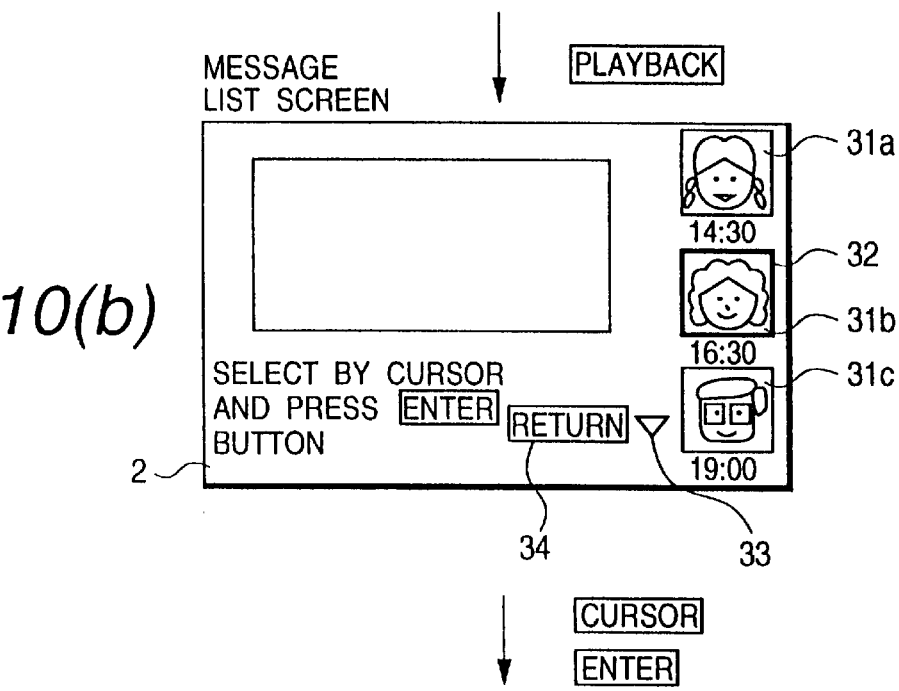
Figure 10C:
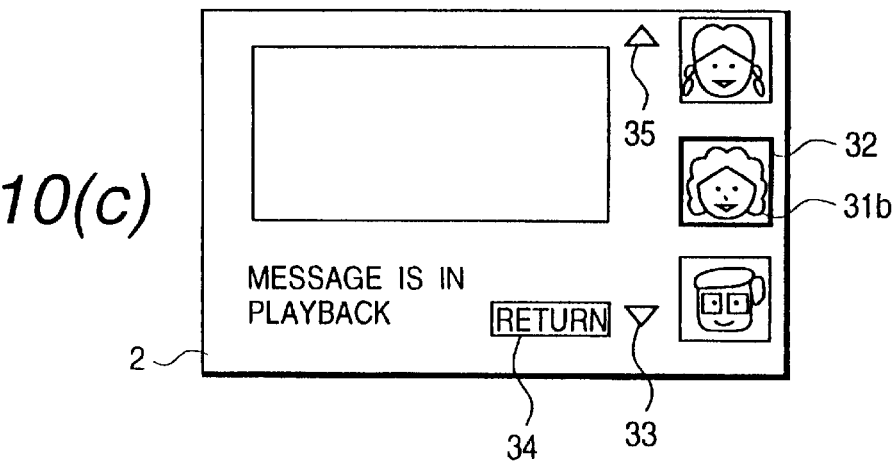
Figure 10D:
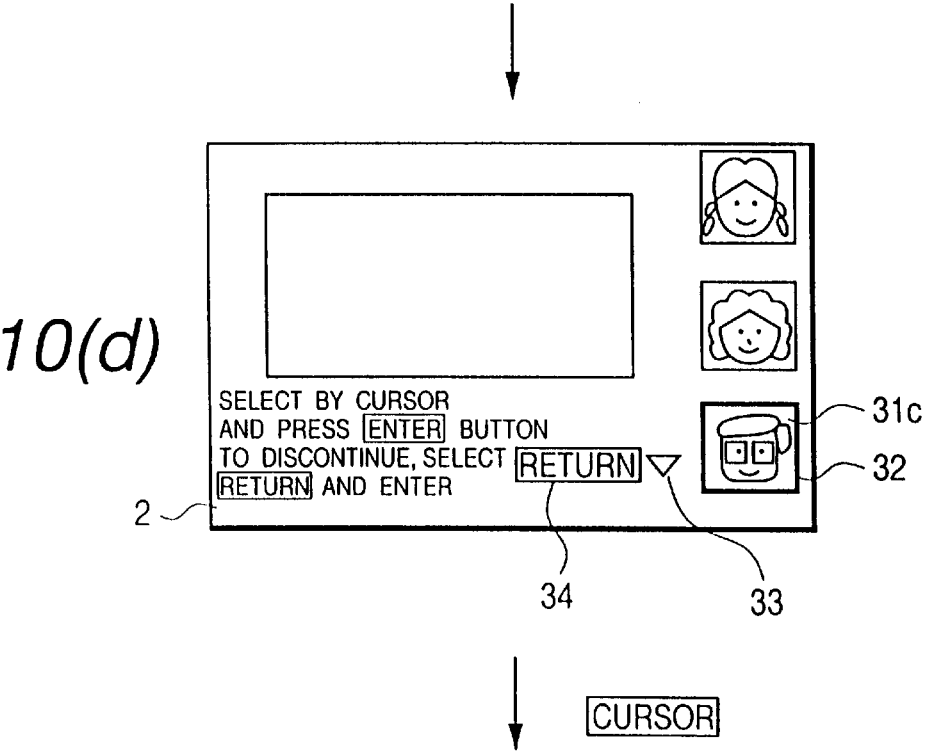
Figure 10E:
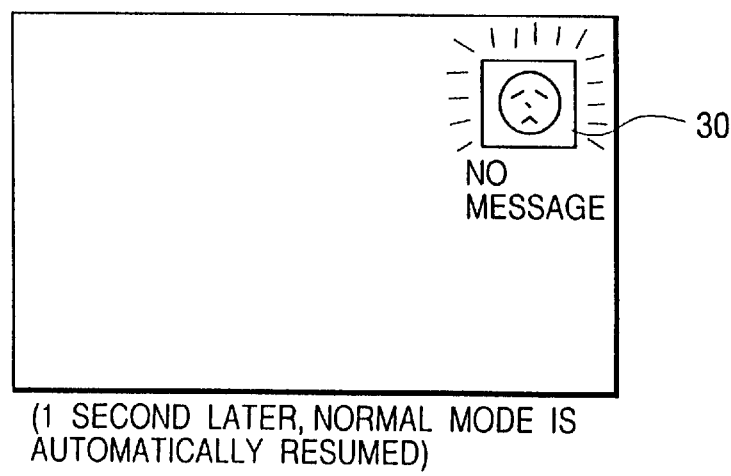

Referring to FIG. 9, when the power button 20 of the remote controller 14 is turned on (step 200), the television receiver main 1 is powered on, upon which the normal screen is displayed in which the received image is displayed on the display screen 2 (step 201). If a message is recorded in the recording medium 9 of the television receiver main 1, an icon 30 or text indicating that there is a message left is displayed in the upper right corner for example of the display screen 2 as shown in FIG. 10 (*a*) (step 202). If no message is recorded in the recording medium 9 of the television receiver main 1, the icon 30 or text indicating that there is no message left is displayed likewise as shown in FIG. 10 (*e*) (step 203). If no message is left, the normal screen in which only the received image is shown is resumed one second later for example (step 201).

If the display is made indicating a message left as shown in FIG. 10 (*a*), operating the playback button 23 of the remote controller 14 (step 204) displays a message list screen as shown in FIG. 10 (*b*) (step 205). In this message list screen, images for a plurality of messages (three in this case for example) are displayed on the display screen 2 as sub screens 31*a*, 31*b* and 31*c*. The received image is displayed as the main screen with an instruction "Select with cursor and press the enter button." In the case of the first embodiment of FIG. 1, images to be displayed in these sub screens 31*a*, 31*b* and 31*c* are the picture 27 of FIG. 6. In the case of the second embodiment of FIG. 2, the images are the first image (still picture) of the animation 29 of FIG. 8. This allows the user to know who left the messages.

Further, the date on which the message was entered is displayed in the proximity of each of the sub screens 31*a*, 31*b* and 31*c*. For a message with its playback date specified, the playback date is also displayed. In FIG. 10 (*b*), the display of specified date is not shown.

In this case, the cursor is indicated by a frame 32 enclosing one sub screen. To reproduce the message for the sub screen 31*b* currently indicated by the cursor 32, jump from step 205 to step 209 and operate the enter button 25 of the remote controller 14 by following the instruction given in the above-mentioned text. At this moment, in the display screen 2, the mouth of the face picture is displayed moving in the sub screen 31*b* in the first embodiment of FIG. 1, giving an impression of talking the message. In the case of the second embodiment of FIG. 2, the picture is displayed in animation.

To reproduce the message for other than the sub screen 31*b* in FIG. 10 (*b*), namely the message for sub screen 31 (*c*) for example (step 206), operating the cursor key 24 of the remote controller 14 as shown in FIG. 10 (*d*) to position the cursor 32 to the sub screen 31*c* (step 207) and then operating the enter button 25 of the remote controller 14 (step 209) reproduce this message.

Further, if the message list screen of FIG. 10(*b*) contains a message other than those of which images are displayed in the sub screens 31*a*, 31*b* and 31*c* (in other words, if there are four or more messages left), a triangular marker 33 is displayed. To reproduce a message of which image is not displayed on the screen (step 208), the cursor key 24 of the remote controller 14 is operated to move the cursor 32 below the bottom sub screen 31*c* because the marker 33 is attached on the lower side of the display screen (step 214). The new image appears, scrolled from bottom to top (step 215). As shown in FIG. 10 (*c*), if the marker 35 is attached on the upper side of the display screen, the cursor 32 is moved above the top sub screen 31*a*, scrolling the images of the sub screens from top to bottom.

Thus, scrolling, positioning the cursor 32 to the sub screen of a desired image, and operating the enter button of the remote controller 14 can reproduce the desired message (step 210).

In the display states indicated by FIG. (b), (c) and (d), "return" indication 34 is given below the display screen 2. This indication is used to stop the above-mentioned display and message (step 211). When the indication 34 is selected by the cursor (step 212) and the enter button 25 of the remote controller 14 is operated, the normal screen in which only the received image is shown appears (step 201).

When one message has been reproduced, the display state of the message list screen of FIG. 10 (*b*) appears (step 205) if there is another message to be reproduced, and whether to reproduce that message or not can be selected. If there is no message to be reproduced, the normal screen in which only the received image is displayed appears (step 201).

It will be apparent that, every time one message has been reproduced, the normal screen in which only the received image is displayed may be resumed (step 201). In this case, the power is turned on back in step 201 and, if there is a message to be reproduced, information indicating "message left" as shown in FIG. 10 (*a*) is displayed; if there is not message to be reproduced, information indicating thereof is displayed as shown in FIG. 10 (*e*).

Thus, in this embodiment, presence or absence of a message and a person who left a message can be known easily. A message with its playback date specified is always reproduced on the specified date regardless whether the television receiver main 1 is in the power-on state or not. Therefore, if a mother leaves a message to her children that she is absent from home for example, she can specify the playback time of her message at a time which the children are home for sure, thereby surely transmitting the message.

(2) The intercom mode

As shown in FIG. 3, the intercom (the intercommunicating system) 15 is installed on the entrance of a home for example. When a visitor presses the calling switch 19, the controller 8 operates in response to lower the volume of a television program being received and outputted from the speakers 10 and 11 and generates a chime sound from at least one of these speakers, thereby indicating the visit.

At the same time, the controller 8 captures an image from the video camera 16 and a voice from the microphone 18 installed on the intercom 15 to display the image on the display screen 2 as a sub screen and outputs the voice from the speakers 10 and 11. This image and voice are also stored in the recording medium 9.

Figure 11:
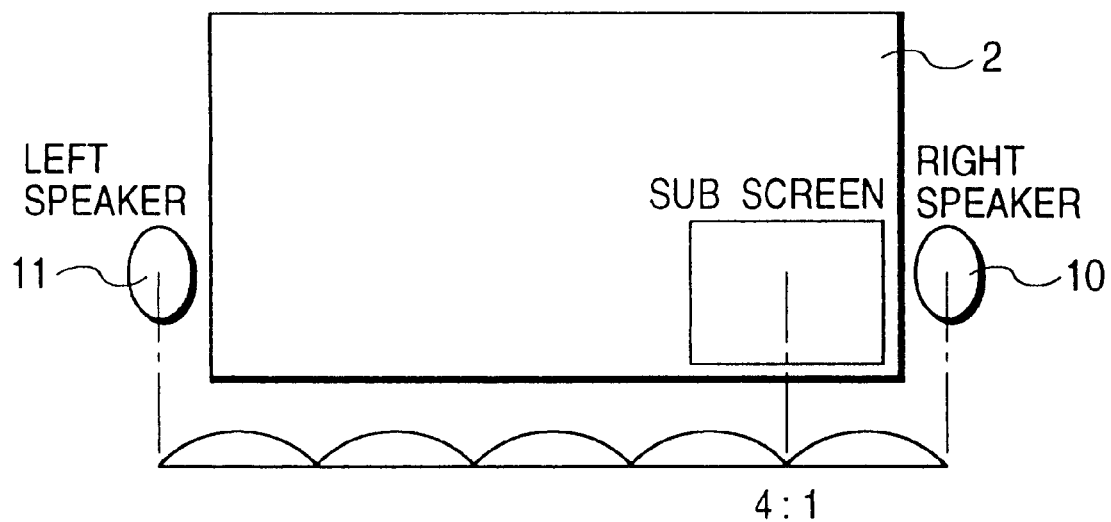
FIG. 11 is a diagram describing output volumes of the speakers of FIG. 3.

The speaker 10 functions as the right-hand speaker and the speaker 11 as the left-hand speaker and the sub screen is displayed at the right side of the display screen 2 as shown in FIG. 11 for example. In this case, the right-hand speaker 10 may be used for the intercom and the left-hand speaker 11 for the television and the volume of the right-hand speaker 10 may be significantly increased over the volume of the left-hand speaker 11. Also, the television voice and the intercom voice may be outputted from the speakers 10 and 11 simultaneously. In such a case, the volume of the intercom through the right-hand speaker 10 may be set to 4 for example and the volume of the television through the right-hand speaker 10 may be set to 1 for example, while the volumes of the intercom and the television through the left-hand speaker 11 may be set to 1 each for example.

Back in FIG. 3, when the user knows the visit upon hearing the chime and operates the remote controller 14, the instruction generated by the operation is transmitted to the controller 8 via the photo detector 13. Receiving the instruction, the controller 8 enables talk between the speaker 17 and the microphone 18 of the remote controller 14 and the intercom 15.

The remote controller 14 may also be operated to make the controller 8 reproduce the image and voice from the recording medium 9, displaying the image on the display screen 2 as a sub screen and outputting the voice from the speakers 10 and 11.

In the intercom mode, a recording area is allocated on the recording medium 9 to record image and voice for more than about five minutes, thus recording image and voice for a talk of about 30 seconds about 10 times or more. In this case, an image signal may be compressed or thinned out to a degree at which the behavior and identification of a visitor can still be determined. A voice signal may also be compressed to a degree at which the voice of a visitor is still clearly audible. For each recording, the date information given by the timer 8*a* (FIG. 3) is used to provide recording date information.

The recording to the recording medium 9 continues from chime sounding to a time when the visitor leaves. For example, if no voice comes from neither the intercom 15 nor the remote controller 14 for 10 seconds after passing of 15 seconds or more, it is assumed that the visitor has left and the recording to the recording medium 9 is stopped.

The recording to the recording medium 9 is started when the chime sounds and the controller 8 operates even if the power to the television receiver main 1 is not in the power-on state (this denotes that the power button of the television receiver main 1 is not turned on; the power cord of the television receiver main 1 should be plugged into a receptacle). This allows the user to record, through the intercom, a message from a visitor who visited while the user was absent from home, the message to be reproduced later.

When image and voice are recorded on the recording medium 9, the controller 8 drives the light emitting section 12 to flash the intercom LED provided on the television receiver main 1, notifying the user of a message left by a visitor. It will be apparent that the intercom LED may be the message LED 6 of FIGS. 1 and 2 or a dedicated intercom LED.

The storage duration of image and voice in the recording medium 9 may be specified by the remote controller 14. There are three types of storage durations:

(a) three days;

(b) only for the day of recording; and (c) until erased by new recordings.

In the case of (c), the capacity of the recording medium 9 is limited and, therefore, the recordings are erased from the recording medium 9 on a first-in, first-out basis. In the cases of (a) and (b), the specified recording is automatically erased upon passing of the storage duration based on the date information provided by the timer 8a (FIG. 3).

In addition to the usual operating buttons such as a power button 36 and numeric buttons 37, the remote controller 14 has a display button 38, an answer button 39, an erase button 40, a cursor key 41, an enter button 42, and a speaker/microphone 43. Through the speaker/microphone 43, talk can be made between the remote controller 14 and the intercom 15 (FIG. 10).

The answer button 39 starts talk with the intercom 15. The display button 38 reproduces the image and voice from the recording medium 9 to display the image on the display screen 2 and output the voice from the speakers 10 and 11. The erase button 40 erases the image and voice recorded in the recording medium 9. The cursor key 41 and the enter button 42 have generally the same functions as those of the cursor key 24 and the enter button 25 of FIG. 4.

In what follows, operations to be performed in the intercom mode will be described.

(i) Recording

Figure 12:
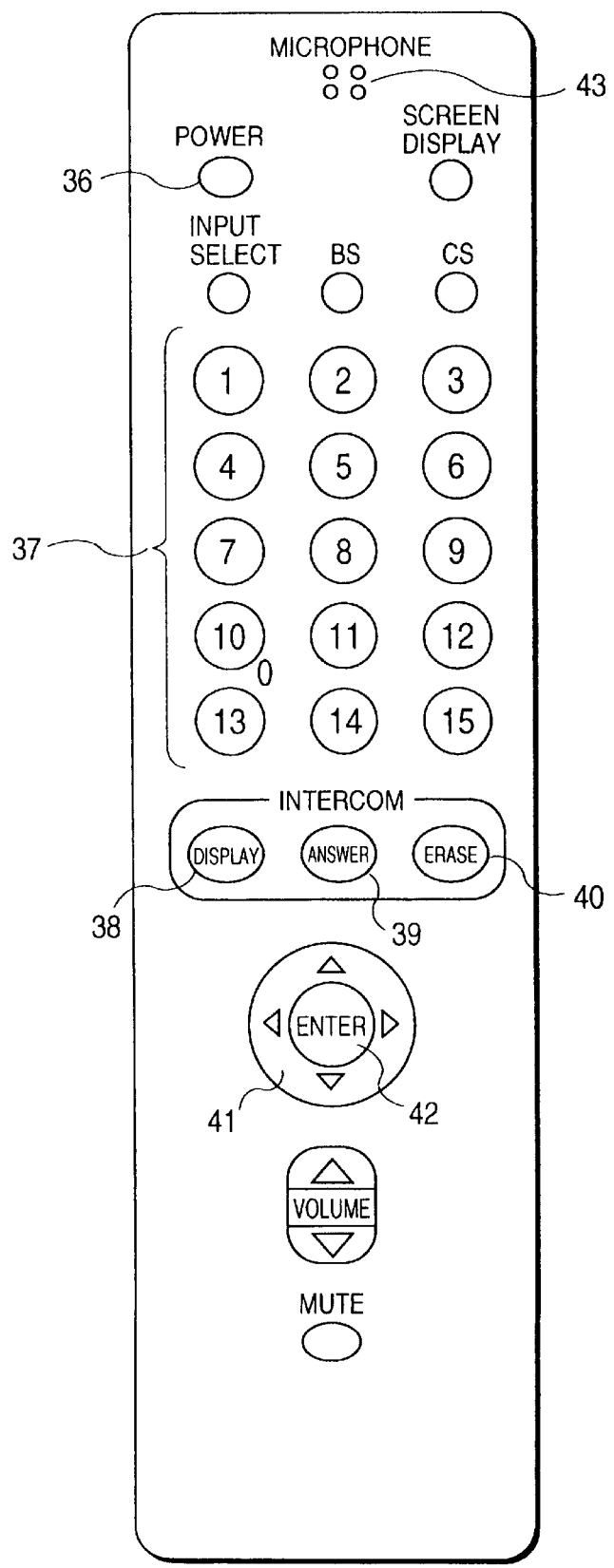
FIG. 12 is a top view illustrating a remote controller for use in an intercom, practiced as one embodiment of the invention.
Figure 13:
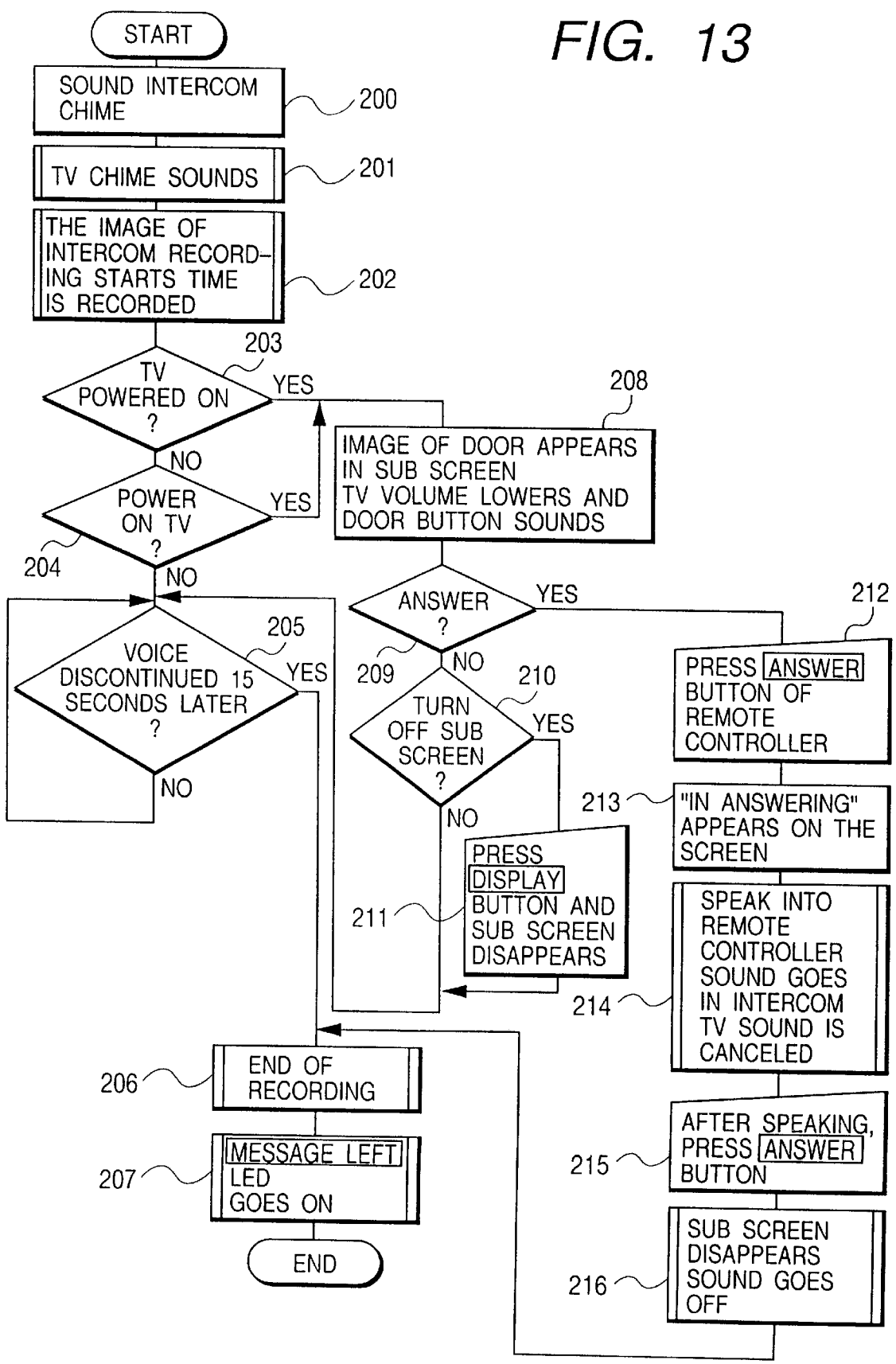
FIG. 13 is a flowchart indicating a recording operation in the intercom mode.

FIG. 13 shows the flowchart indicating a recording operation, which will be described with reference to FIGS. 3 and 12.

Referring to FIG. 13, when a visitor operates the calling switch 19 (step 201) and the intercom chime sounds (step 201), the controller 8 operates to start recording image and voice coming from the intercom 15. In this case, information of recorded date provided by the timer 8a (FIG. 3) is recorded together (step 202).

At this moment, if the television receiver main 1 is not in the power-on state (step 203) or not powered on because the user is absent from home for example (step 204), the recording continues without change. When, after 15 seconds following the start of recording, the voice coming from the intercom 15 or the remote controller 14 is discontinued for 10 seconds (step 205), the controller 8 stops the recording by assuming that the visitor has left (step 206) and drives the light emitting section 12 to turn on the intercom LED, informing that a visitor came (step 207).

If the television receiver main 1 is in the power-on state when the recording in the recording medium 9 gets started upon sounding of the intercom chime (step 203) or is powered on (step 2204), the image coming from the intercom 15 is displayed on the display screen 2 as a sub screen and the voice coming from the intercom is outputted from the speakers 10 and 11 (step 208).

Figure 14:
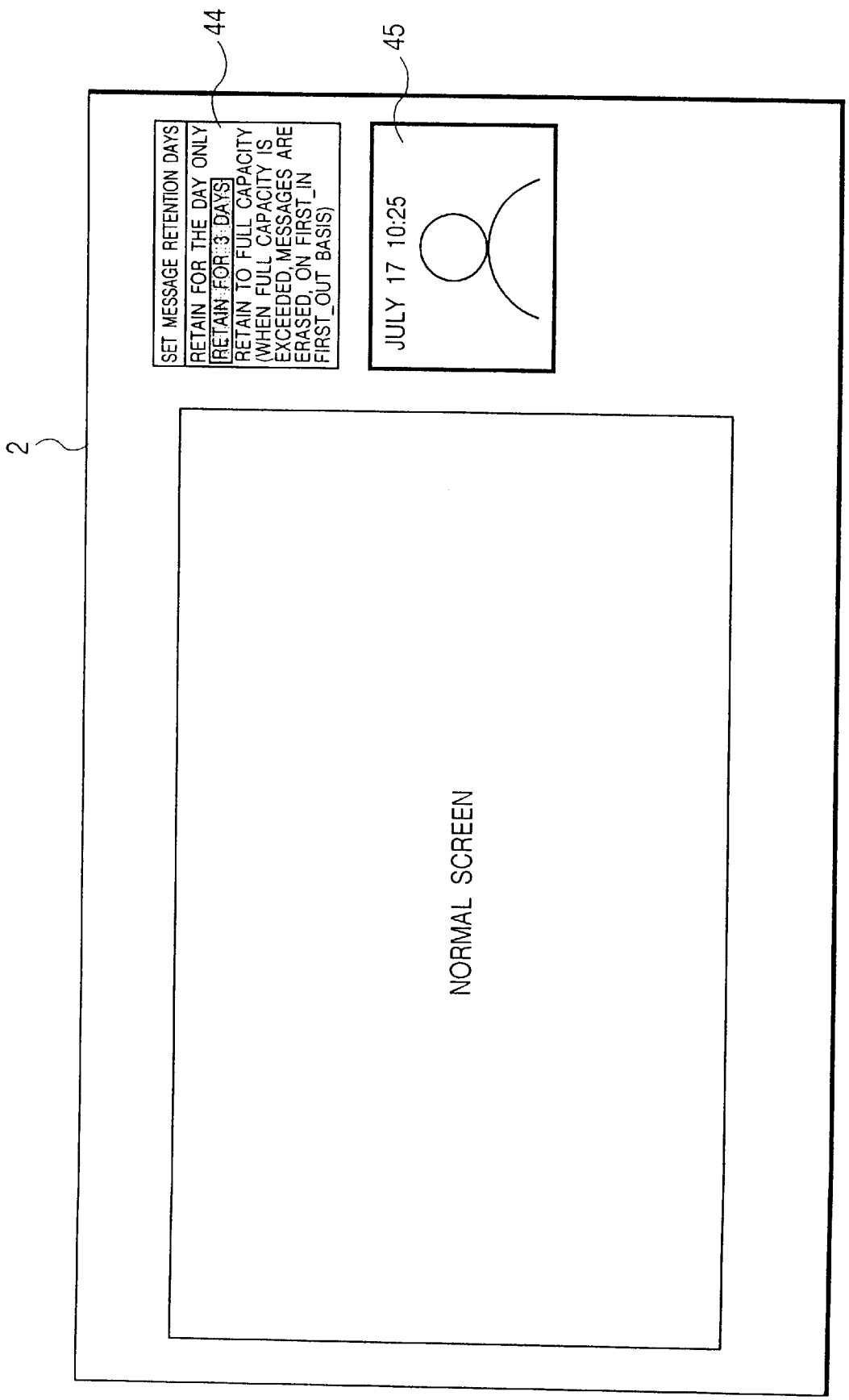
FIG. 14 shows an example of a display screen displayed when DISPLAY button on the remote controller of FIG. 12 is operated in the operation of FIG. 13.

The display screen 2 shown in the above-mentioned state is shown in FIG. 14.

As shown, to the right of the display screen 2, two sub screens 44 and 45 are formed. The sub screen 44 shows an image for specifying a message storage duration as an intercom screen. The sub screen 45 shows an image currently coming from the intercom 15 as an intercom screen. For the storage duration, one of the above-mentioned three durations (a), (b) and (c) can be selected. In FIG. 14, the duration (a), namely three days, is initially set. The selection can be made by moving the cursor (a shadowed frame) by operating the cursor key 41 and the enter button 42 of the remote controller 14. This selection can be made any time during talking. The selected storage duration applies to all recordings in the recording medium 9.

Referring to FIG. 13 again, if, in that display state, no answer is made to the visitor (step 209) and the sub screens are kept displayed without change (step 210), the user does not operate the remote controller 14. To erase the sub screens (step 210), the user operates the display button 38 of the remote controller 14 (step 211), upon which the sub screens 44 and 45 of FIG. 14 disappear followed by the operations of steps 205 through 207.

Figure 15:
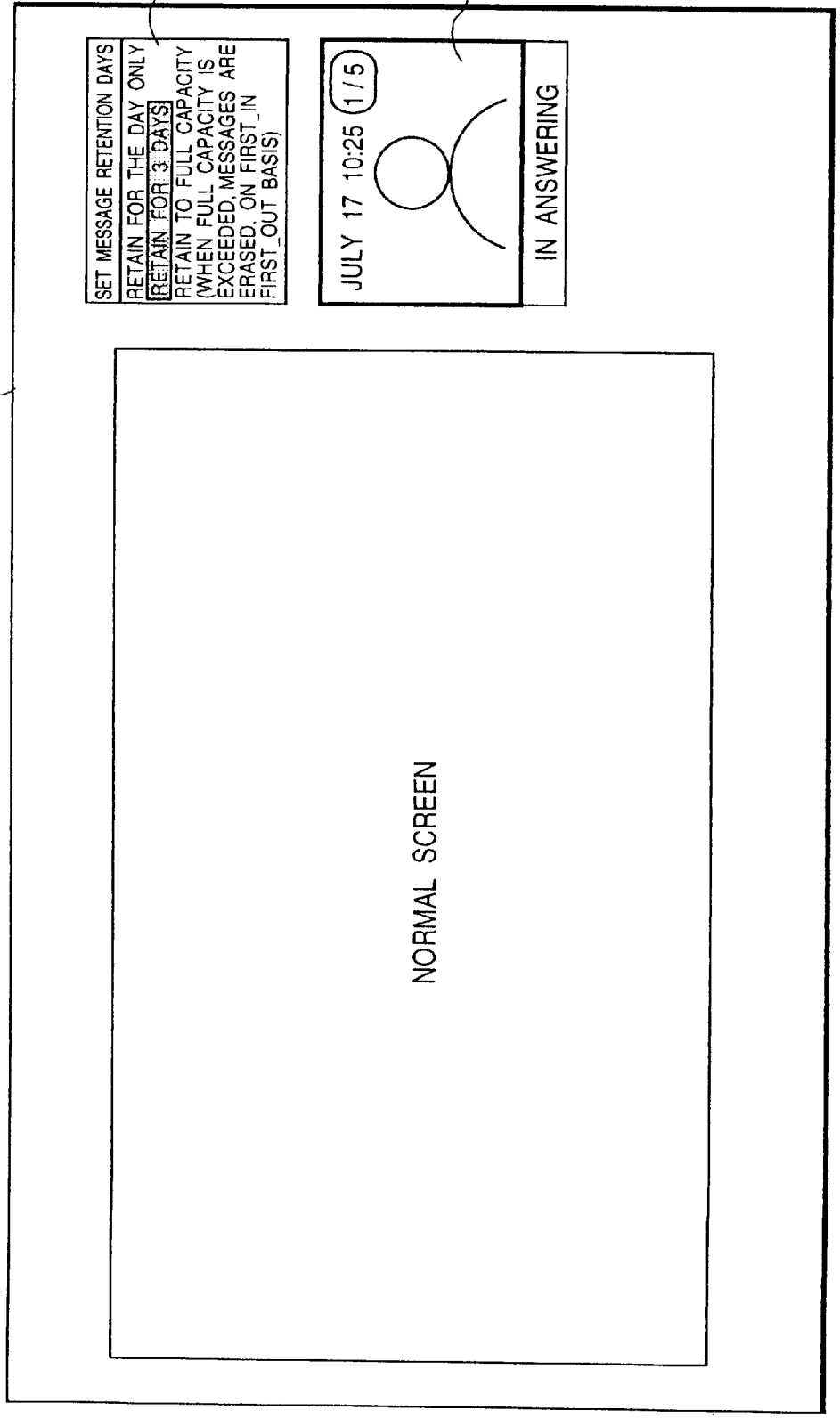
FIG. 15 shows an example of a display screen displayed when ANSWER button on the remote controller of FIG. 12 is operated in the operation of FIG. 13.

If the user was to answer the visitor (step 209) in the display state of FIG. 14 (step 208), the user operates the answer button 39 of the remote controller 14 (step 212). This operation causes the text "in answer" to be displayed below for example the sub screen in which the intercom screen coming from the intercom 15 is displayed (step 213), enabling talk between the remote controller 14 and the intercom 15 (step 214). To end the talk, the user need only operate the answer button 39 of the remote controller 14 again (step 215), upon which the sub screens 44 and 45 of FIG. 15 disappears from the display screen 2 (step 216). The process then goes to step 206 described above.

(ii) Playback

Figure 16:
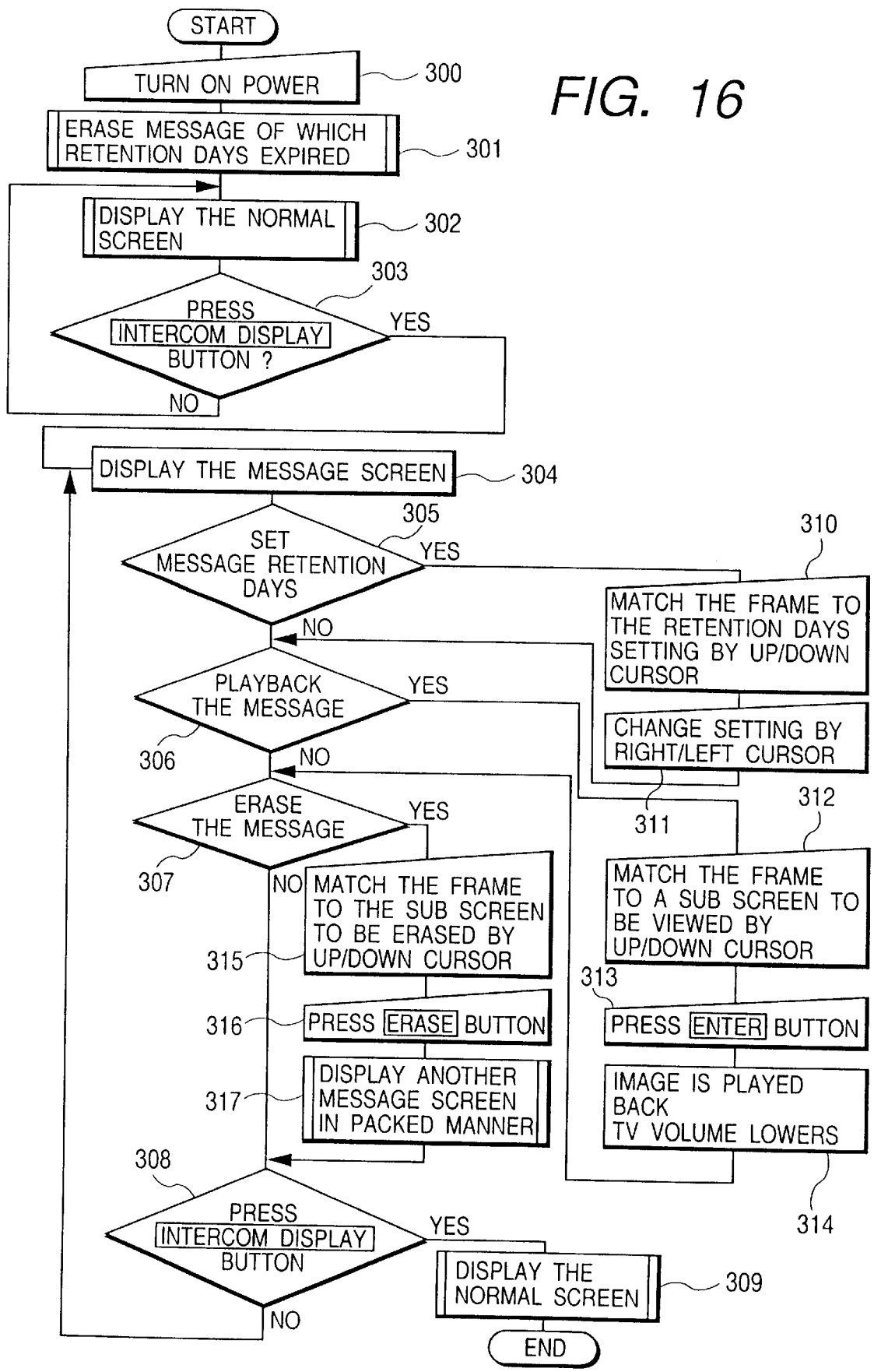
FIG. 16 is a flowchart indicating a reproducing operation of the intercom mode.

FIG. 16 shows the flowchart indicating the playback operation, which will be described with reference to FIGS. 3 and 12.

Referring to FIG. 16, when the power button 36 of the remote controller 14 is operated to power on the television receiver main 1 (step 300), the controller 8 erases from the recording medium 9 any message of which the storage duration has passed (step 301) and displays the normal screen on the display screen 2 (step 302). If a message is recorded in the recording medium 9, the intercom LED of the television receiver main 1 is turned on to notify thereof. At the same time, an icon and text for indicating that there is a message are displayed in the same manner as shown in FIG. 10 (a).

Figure 17:
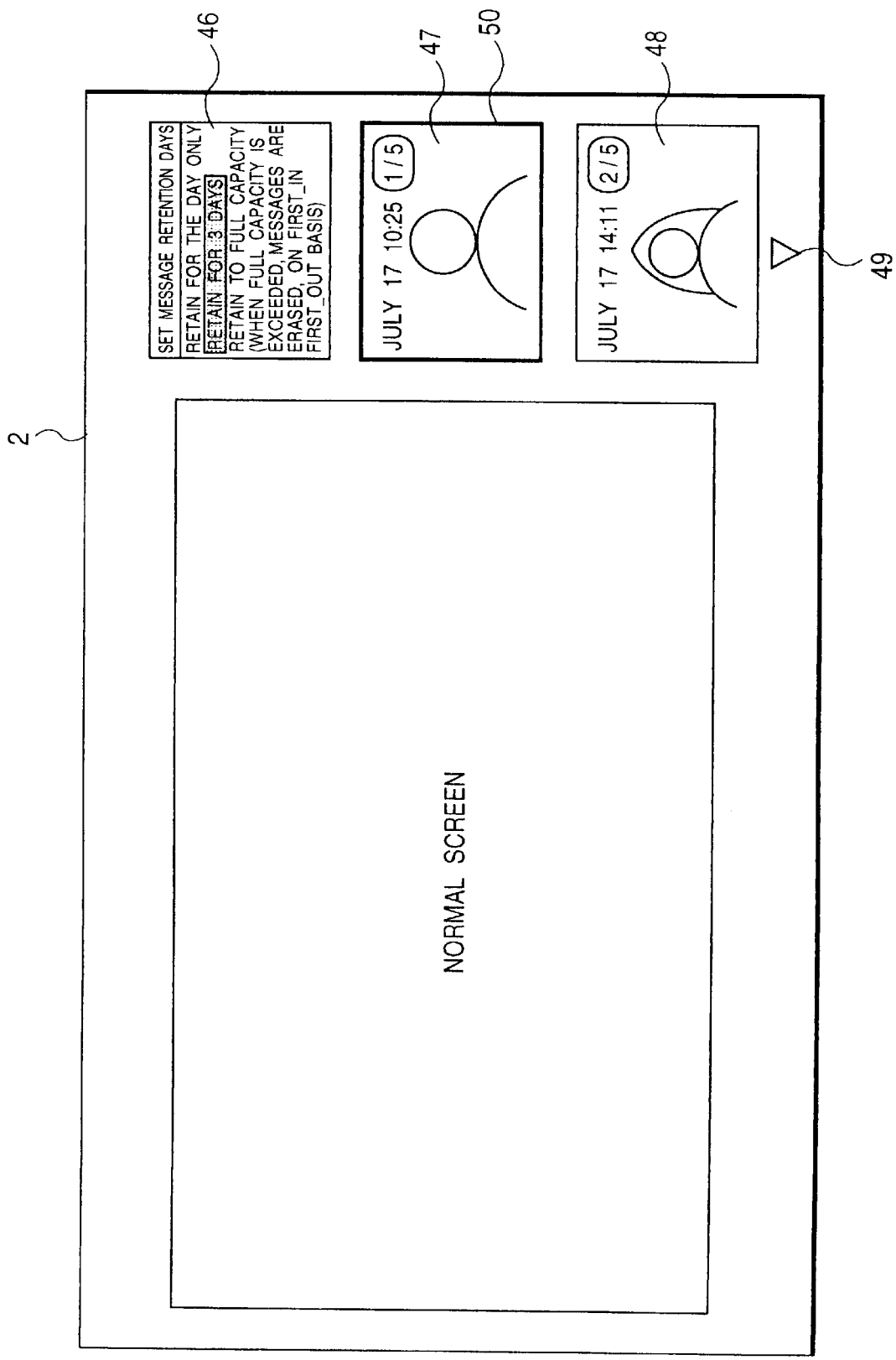
FIG. 17 shows an example of a display screen displayed when DISPLAY button on the remote controller of FIG. 12 is operated in the operation of FIG. 16.

When the display button 38 of the remote controller 14 is operated in this state (step 303), a message screen as shown in FIG. 17 is displayed (step 304). To be more specific, in this message screen, the normal screen is the main screen and three sub screens for example are displayed. An uppermost sub screen 46 shows a screen for setting the number of storage days. Lower two sub screens 47 and 48 each show a first image as a still picture reproduced from the recording medium 9 in the order in which these images were recorded. These sub screens each also show the date and time of recording, the order of recording, and the number of images recorded in the recording medium 9, the last two pieces of information being expressed in the form of a fraction. If the displayed images are followed by another image, a triangular marker 49 is displayed below the sub screens 46 through 48.

To reproduce any message displayed in the above-mentioned display state (step 306), the user operates the cursor key 41 of the remote controller 14 to position a frame-shaped cursor 50 to the sub screen 47 in which the message to be reproduced is displayed for example (step 312) and operates the enter key 42 of the remote controller 14 (step 313). This causes the selected sub screen 47 to be displayed in animation and the voice message is reproduced from the recording medium 9 to be outputted from the speakers 10 and 11 (step 314). At this moment, the volume of the voice message is made distinctively audible from the television sound as described before.

When the reproduction of the message has come to an end, the process goes back to step 304 in which the original display state is resumed as shown in FIG. 17 if the remote controller 14 is not operated (step 308). To end the message playback, the user operates the display button 38 of the remote controller 14 again (step 308).

To change the storage duration of image and voice recorded in the recording medium 9 in the display state of FIG. 17 (step 305), the user operates the cursor key 41 of the remote controller 14 to move the cursor 50 to the sub screen 46 in which the screen for setting the number of storage days is shown (step 310), then operates the cursor key 41 to move the cursor of changed shape laterally to the number of storage days to be specified in the screen for setting the number of storage days, and presses the enter button 42 of the remote controller 14 (step 311).

Figure 18:
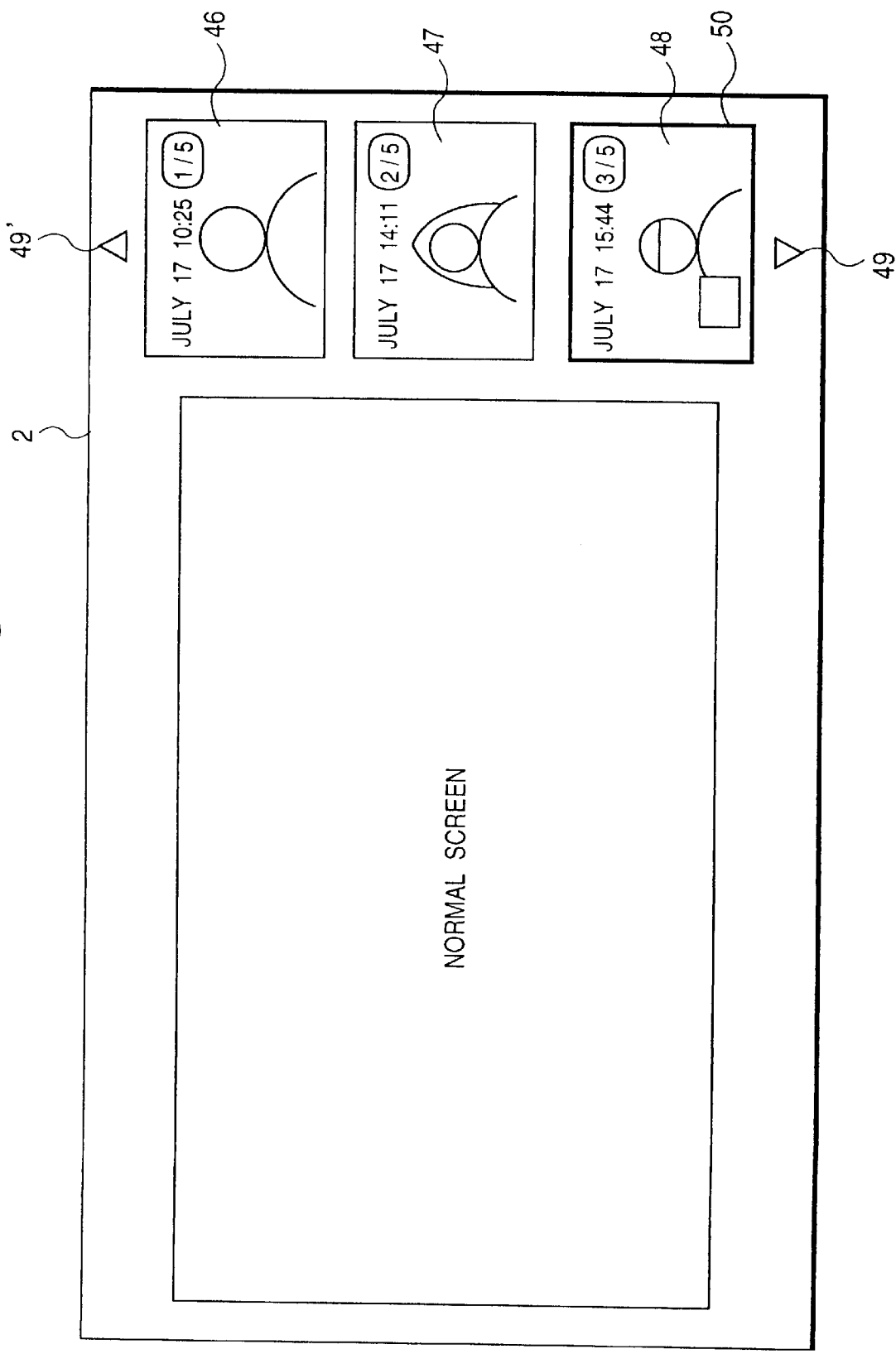
FIG. 18 shows an example of a display screen displayed when the display has been changed to another message image in the display example of FIG. 17.
Figure 19A:
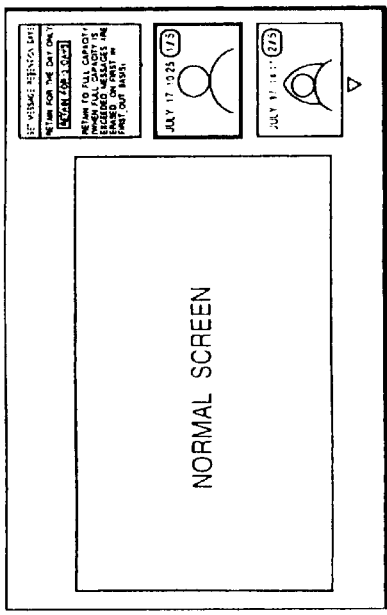
FIG. 19 shows changes of display screens in the reproducing operation of FIG. 16.
Figure 19B:
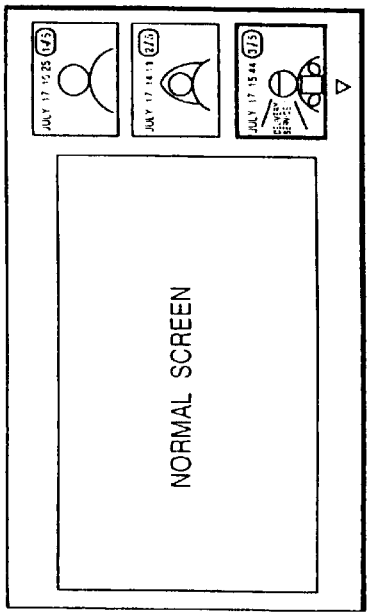
Figure 19C:
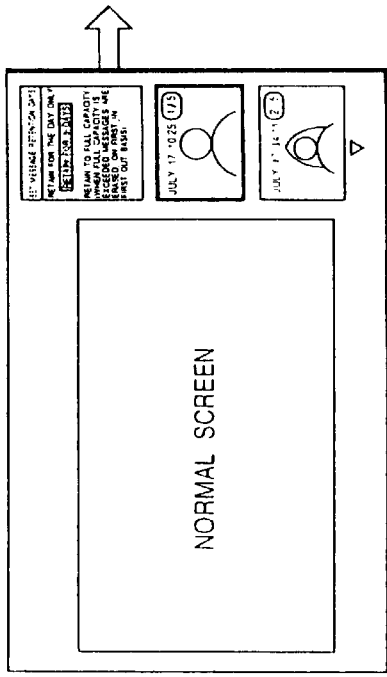
Figure 19D:
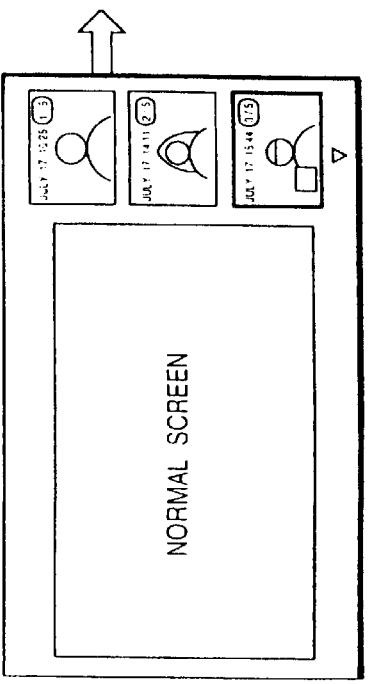

To reproduce a message other than the messages displayed in FIG. 17, the user operates the cursor key 41 to move the cursor 50 below the bottom sub screen 48. This causes a new image to appear in the bottom sub screen as shown in FIG. 18.

Further, to erase an unnecessary message (step 307), the user operates the cursor key 41 of the remote controller 14 to move the cursor 50 vertically to the sub screen in which the unnecessary message is displayed (step 315) and operates the erase button 40 of the remote controller 14, upon which the unnecessary message is erased from the recording medium 9 (step 316). When the erasure is complete, the subsequent image appears in the sub screen (step 317).

FIG. 19 shows changes of the displayed contents of the display screen 2 caused by the above-mentioned operations. FIG. 19 (a) shows the screen first displayed in the display screen 2 when the display button 38 of the remote controller 14 is operated (step 303). When the cursor key 41 of the remote controller 14 is operated in this state to perform the operations of steps 310 and 311, the display screen of FIG. 19 (b) appears in which the storage duration can be changed.

When the cursor key 41 and the enter key 42 of the remote controller 14 are operated in the display state of FIG. 19 (a) to perform the operations of steps 312 through 314, the state changes from that shown in FIG. 19 (c) to that shown in FIG. 19 (d), upon which the desired message is reproduced and animation is displayed in the sub screen.

Thus, in the intercom mode, talk can be made with the visitor through the intercom 15 while watching the screen on the television receiver main 1. This mode also allows the user to hear a message reproduced from the recording medium 9 if such a talk cannot be made because of absence from home for example and know for sure who the visitor was from the reproduced image.

(3) The code message mode

In the code message mode, a message text of predetermined format coming from a tone-dialing telephone apparatus outside home such as a tone-dialing public telephone apparatus is received to be displayed on the display screen 2 of the television receiver main 1 (FIG. 1 or 2).

Figure 20:
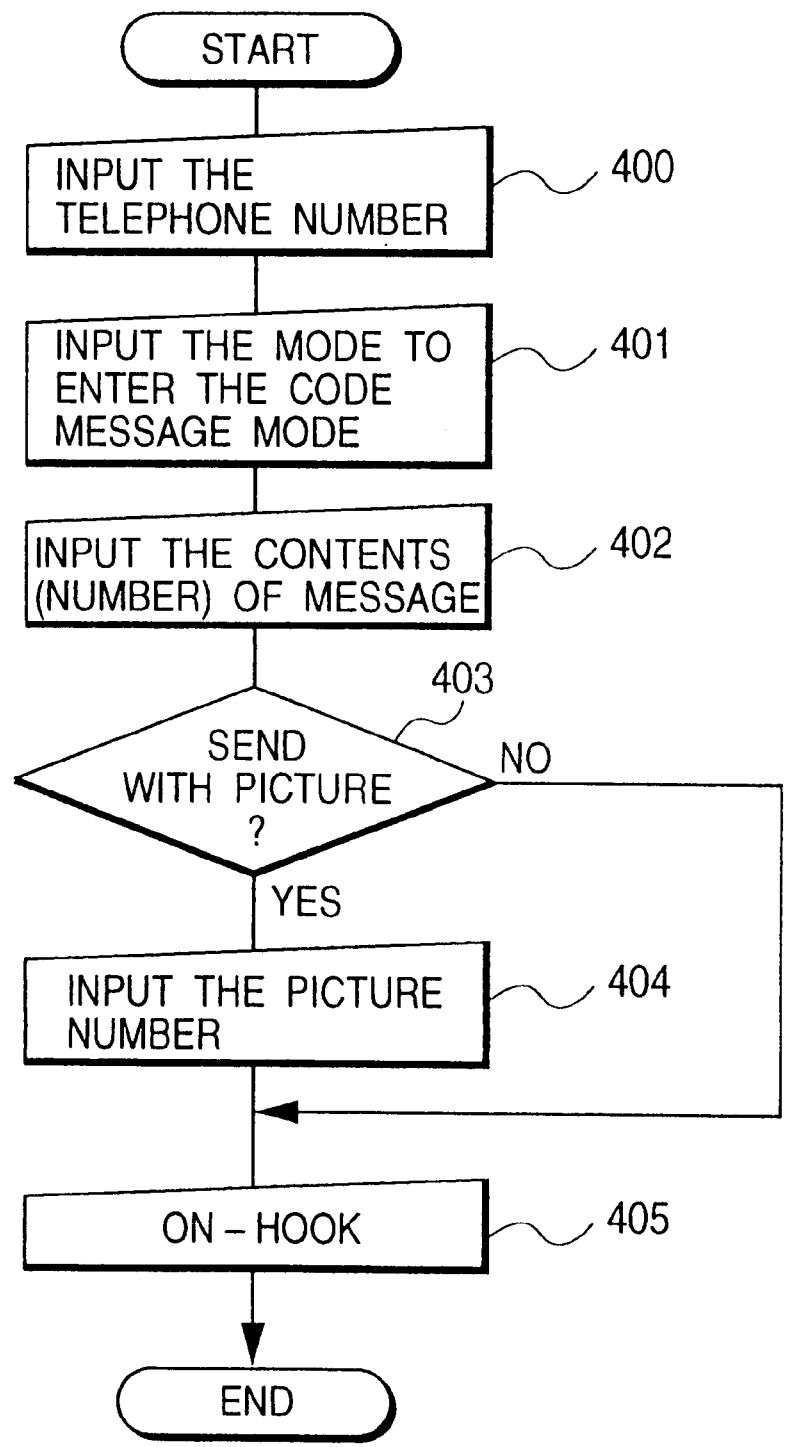
FIG. 20 is a flowchart operations of the message originating side in code message mode.

FIG. 20 is a flowchart indicating message originating operations on such a tone-dialing telephone apparatus.

In the figure, when the tone-dialing is made and connection with the television receiver main 1, a home communication television, of user's home is established (step 400), the user operates the telephone apparatus to put the television receiver main 1 in the code message mode (step 401) to transmit a message of predetermined format by operating push buttons of the telephone (step 402). In the code message mode, several texts of predetermined format are prepared to each of which a code having a different number of digits is assigned. When transmitting a desired text, the user enters a corresponding code through push buttons to send the code to the television receiver main 1 of the user's home of FIG. 3 over the telephone line.

Following the transmission of the message, the user can transmit a picture (step 403). This picture represents the face of a family member as described with reference to FIG. 6, the picture being assigned with a unique numeric code. It should be noted that the television receiver main 1 stores the image of the picture corresponding to its code.

When the user enters the code corresponding to the picture of the user, namely the person who wants to leave a message, from the tone-dialing telephone apparatus (step 404), the code is transmitted to the television receiver main 1 over the telephone line, the picture corresponding to the code is selected, and the selected picture and the message of predetermined format sent from the user are stored in the recording medium 9. In the code message mode, a recording area is also assigned in the recording medium 9.

When the user has entered the code corresponding to the desired message and the code corresponding to the picture of the user through the tone-dialing telephone apparatus, the user disconnects the telephone to complete the sending operation (step 405).

Thus, the message of predetermined format can be transmitted from the outside to the television receiver main 1 of home.

Figure 21:
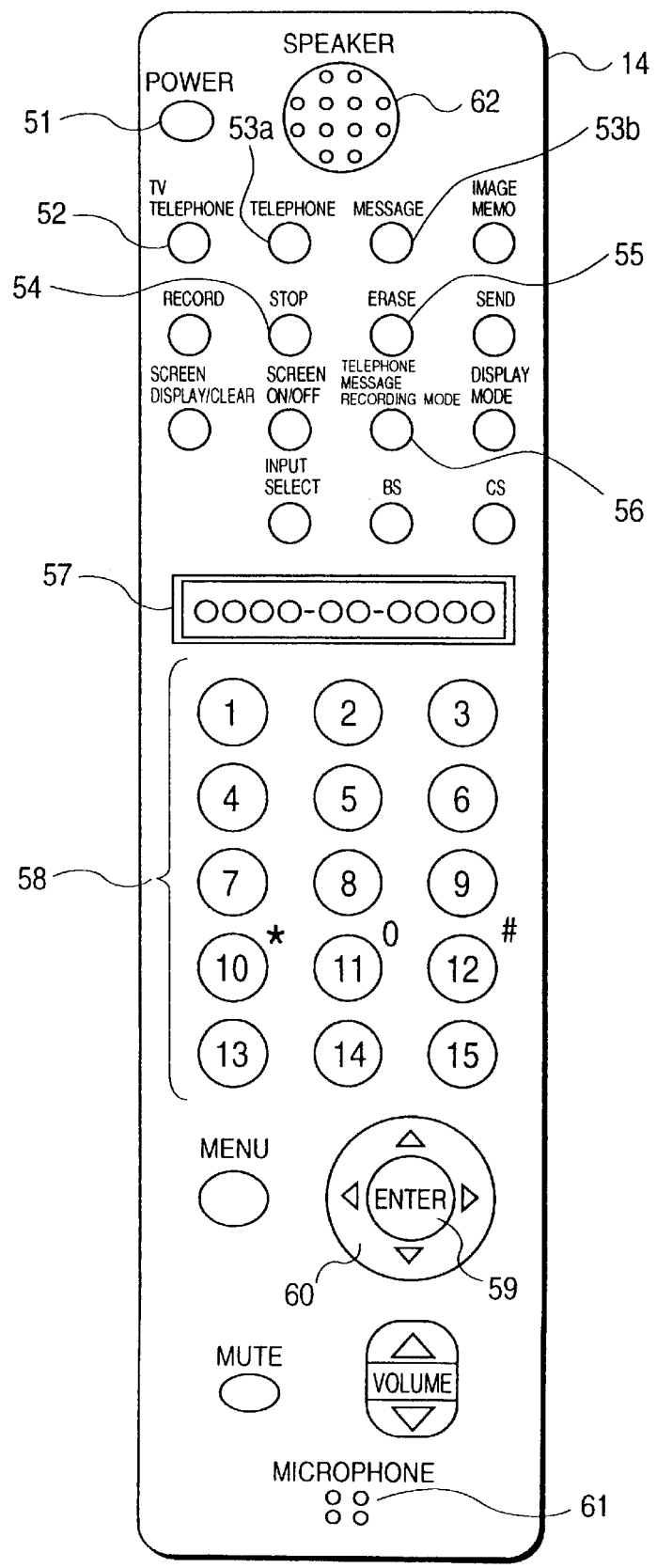
FIG. 21 is a top view illustrating a remote controller shared by code message mode and TV telephone mode, practiced as one embodiment of the invention.

Now, referring to FIG. 21, there is shown the remote controller 14 for use in the code message mode practiced as one preferred embodiment of the invention. This remote controller 14 is shared by the TV telephone mode. Reference numeral 51 indicates TV telephone mode button, 53a indicates a telephone button, 53b indicates a code message mode button, 54 indicates a stop button, 55 indicates an erase button, 56 indicates an automatic answer mode button, 57 indicates a display window, 58 indicates numeric buttons, 59 indicates an enter button, 60 indicates a cursor key, 61 indicates a microphone, and 62 indicates a speaker.

In FIG. 21, the speaker 62 is arranged in the upper portion of the remote controller 14 and the microphone is arranged in the lower portion, thereby preventing the sound generated by the speaker 62 from getting in the microphone 61. The automatic answer mode button is used to set the mode in which an answer is automatically made to a call made when the user is absent from home for example.

Figure 22:
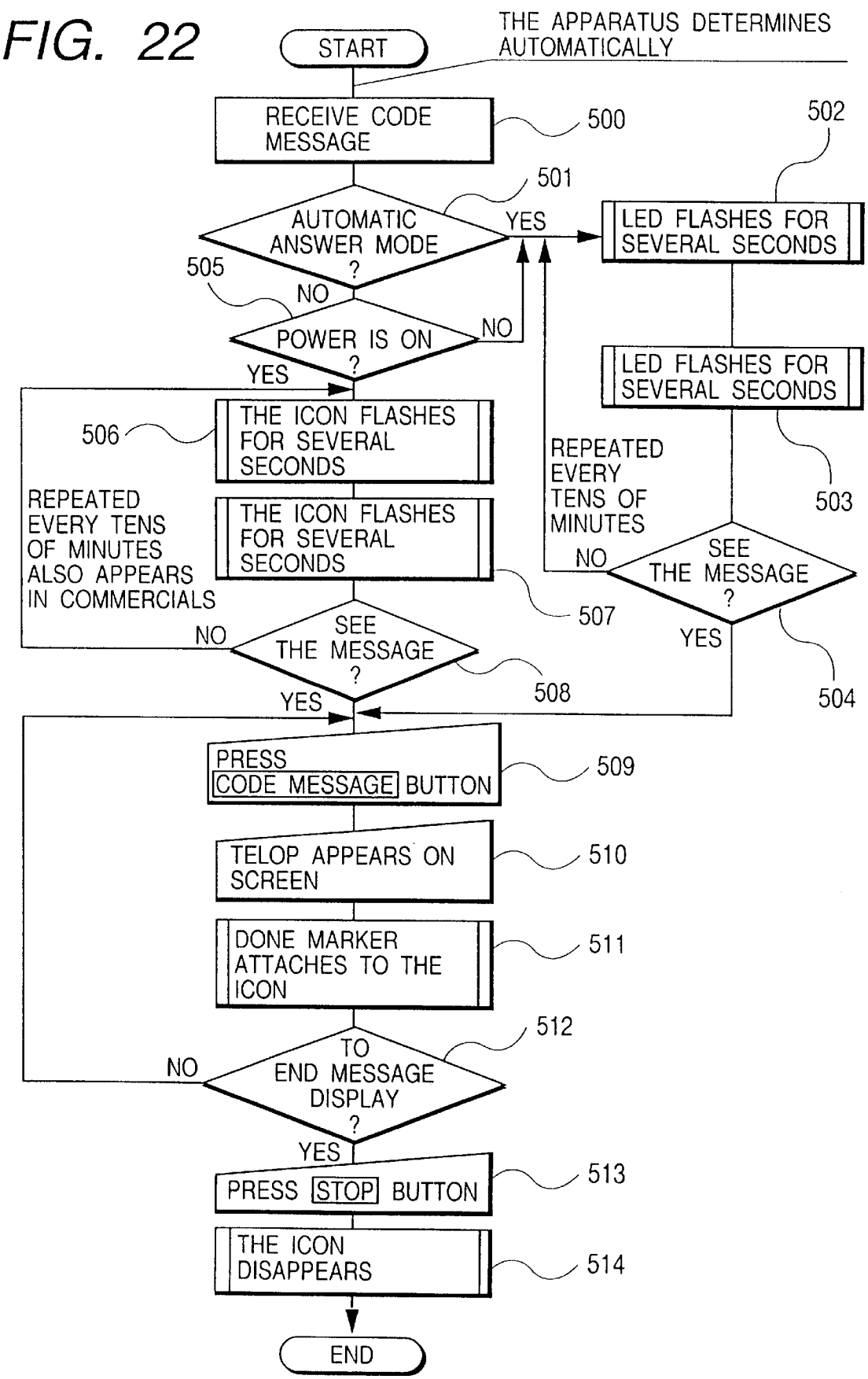
FIG. 22 is a flowchart indicating a reception reproducing operation in code message mode.
Figure 23A:
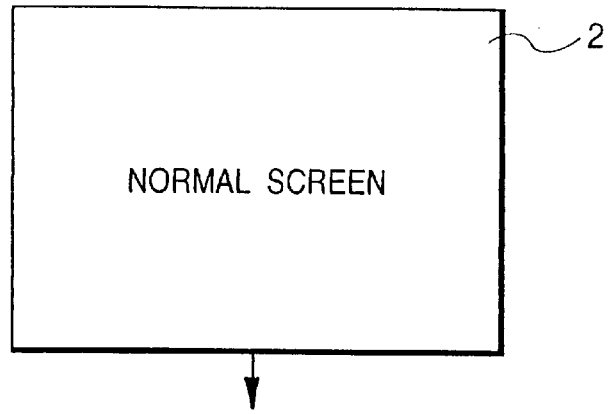
FIG. 23 shows an example of display screens displayed in the reception reproducing operation of FIG. 22.
Figure 23B:
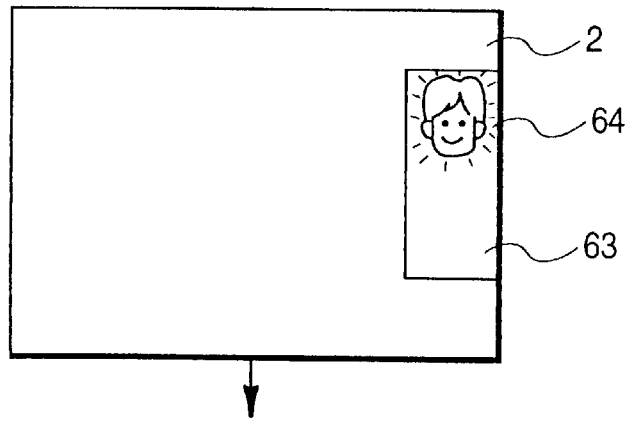
Figure 23C:
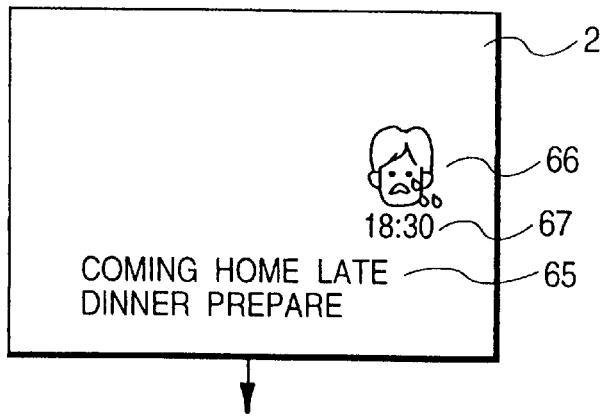
Figure 23D:
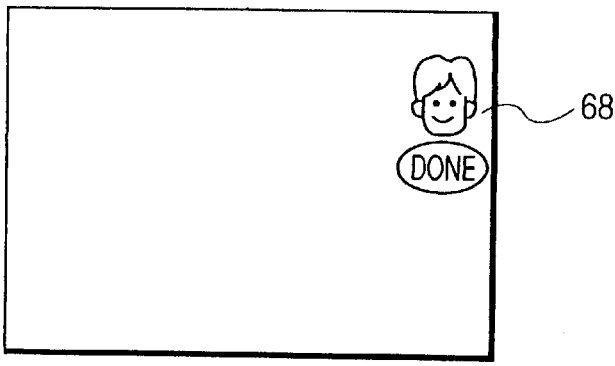

FIG. 22 is a flowchart indicating the operations of the code message mode of the television receiver main 1 for the message shown in FIG. 20. In what follows, these operations will be described with reference to FIGS. 3 and 21 which shows the remote controller 14.

As shown in FIG. 20, when a code message comes, it is received and the message and the picture carried by it are stored in the recording medium 9 (FIG. 3) (step 500). At this moment, if the automatic answer button 56 of the remote controller 14 has been operated to put the television receiver main 1 in the automatic answer mode (step 501) or the television receiver main 1 is in the power-off state (step 505), an operation in which a code message LED (this LED may be shared by the message LED 6 of FIGS. 1 and 2) flashes for several seconds (step 502) and an operation in which the code message LED is on for several minutes (step 502) are repeated every tens of minutes to tell the family that a code message has come. To know the contents of the code message, the user operates the code message mode button 53b arranged on the remote controller 14 (step 509).

If a code message comes when the power button 51 of the remote controller 14 has been operated to power on the television receiver main 1 and the display screen is the normal screen in which only the received image is displayed as shown in FIG. 23 (a) (step 505), an icon area 63 is set in the right corner for example of the display screen 2 as shown in FIG. 23 (b). In this icon area 63, an icon 64 flashes for several seconds (step 506) and goes on for several minutes (step 507), which are repeated every tens of minutes. To know the contents of the message (step 508), the user operates the code message mode button 53b of the remote controller 14 (step 509).

When the user operates the code message mode button 53b (step 509), a code message of predetermined format 65 is displayed as opaquely projected (Telop) on the display screen 2 as shown in FIG. 23 (c) and, at the same time, a picture 66 representing the person who left the message and a message reception date 67 are displayed (step 510). For the message reception date 67, the date information provided by the timer (FIG. 3) is used. When the display of the code message 65 comes to an end, an icon 68 attached with "DONE" marker is displayed on the display screen 2 (step 511) as shown in FIG. 23 (d).

Then, when the code message mode button 53b of the remote controller 14 is operated (steps 512 and 509), a next message is displayed. When the stop button 54 of the remote controller 14 is operated (steps 512 and 513), the icon 68 disappears and the display state of the normal screen shown in FIG. 23 (a) is resumed (step 514).

In the state of step 514, unless the erase button 55 of the remote controller 14 is operated, the code message remains unerased in the memory. This is indicated by turning on of the code message LED of the television receiver main 1 for example. When the code message mode 53b is operated in such a state, the operation starts from step 509 to display the code message. In this case, a code message displayed once may be attached with the "DONE" marker to the picture 66 shown in FIG. 23 (c), allowing the user know that the "DONE" message is a message already viewed.

When the display of the code message has come to an end as shown in FIG. 23 (d), operating the erase button 55 of the remote controller 14 causes this code message to be erased. In this case, messages are erased one by one; it will be apparent, however, that all of the code messages stored in the memory may be erased at once without displaying them.

It will also be apparent that still images may be used instead of the above-mentioned pictures. In the case of the television receiver main 1 of FIG. 2, the still images of the faces of all family members for example may be registered from the video camera 7 for use for the above-mentioned pictures.

In this embodiment, a code message can also be transmitted to the other party through the remote controller 14 shown in FIG. 21. In this case, as shown in FIG. 21, the user first operates the telephone button 53a and enters the telephone number of the other party through numeric buttons 58. The entered telephone number "XXXX-XX-XXXX" for example of the other party is displayed in the display window 57. Then, operating the enter button 59 causes the telephone to originate a call to the other party. Then, when the connection with the other party is established, the user operates numeric buttons 58 of the remote controller 14. To be more specific, the user enters "4649-" for example that indicates the entry of a code message ("-" is entered from "#" button of numeric buttons 58). Then, the user enters a code for a desired code message of predetermined format (in this case, a two-digit value for example). The input information "4649-23" for example appears in the display window 57. When the user operates the enter button 59, the message of predetermined format corresponding to the specified code "23" is transmitted to the other party as a code message and stored in the memory.

(4) TV telephone mode

As shown in FIG. 3, in the second embodiment (FIG. 2), the television receiver main 1 is also connected to the telephone line also to provide the TV telephone capability. When the TV telephone mode is set by operating the TV telephone mode button 52 of the remote controller 14 (FIG. 21) and the TV telephone number of the other party is entered through numeric buttons 58 of the remote controller 14 for example, the screen of the user and the screen of the other party are displayed in the display screen of the television receiver main 1 as sub screens, thereby enabling talk with the other party. In this case, the received image is displayed as a main screen but the voice accompanying the received image is muted. On the remote controller 14, the entered telephone number of the other party is displayed in the display window 57 for confirmation.

The above-mentioned TV telephone also provides the message capability in the second embodiment, which will be described below with reference to FIGS. 21, 24, 25 and 3.

If a TV telephone call comes (step 600) when the television receiver main 1 is in the automatic answer mode caused by operating the automatic answer mode button 56 of the remote controller 14 (FIG. 21) (step 601) or the television receiver main 1 is not in the power-on state (step 602), the television receiver main 1 is put in the state in which the same receives image and voice message from the other party. In the television receiver main 1, the controller 8 operates to record the message in the recording medium 9 (step 603). When the recording is completed, the controller 8 drives the light emitting section 12 to turn on the message LED for the TV telephone (step 604).

In the TV telephone mode, a recording area is also assigned in the recording medium 9 and the TV telephone LED may be shared by the message LED 6 of FIGS. 1 and 2.

Figure 25A:
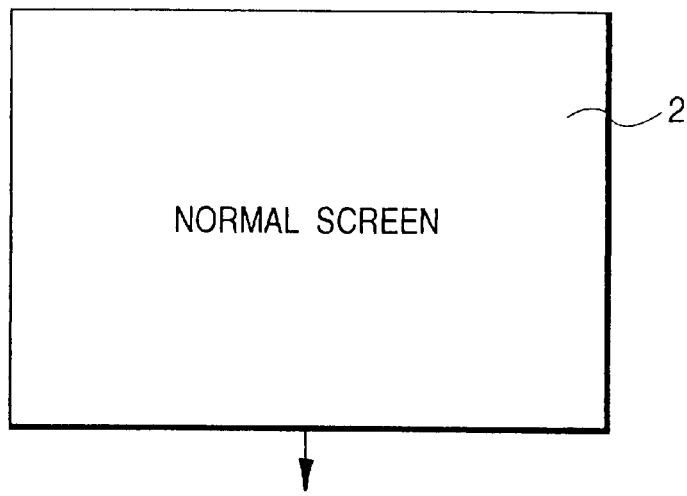
FIG. 25 shows an example of display screens displayed in the operations of FIG. 24.
Figure 25B:
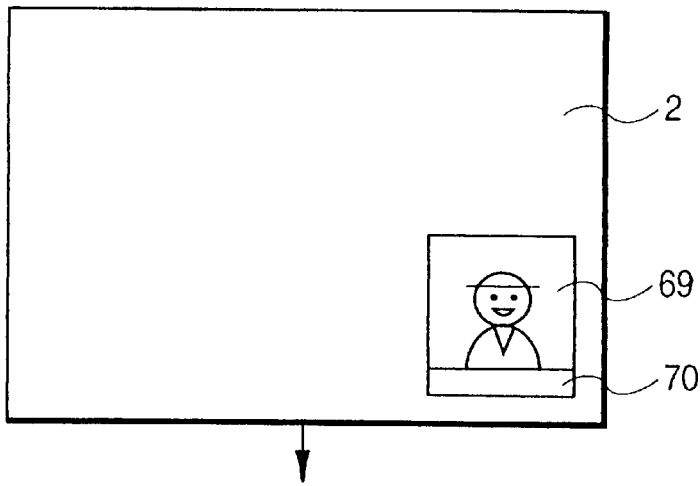
Figure 25C:
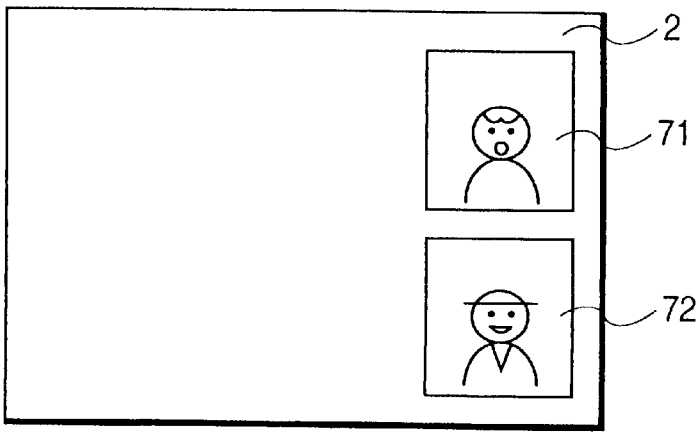

Then, when a family member notices that the TV telephone LED is on for example and wants to view the message (step 605), the user turns on the power to the television receiver main 1 if the power has been off (step 606). The display screen 2 of the television receiver main 1 displays the normal screen in which only the received image is shown as shown in FIG. 25 (a). When the user operates the TV telephone button 52 of the remote controller 14 in this state (step 607), the TV telephone message is reproduced from the recording medium 9 (FIG. 3) and the image of the other party is displayed in a sub screen 69 as shown in FIG. 25 (b) (step 608).

To discontinue the display of this message (step 609), the user need only operate the stop button 54 of the remote controller 14 (step 610), upon which the display screen 2 of the television receiver main 1 resumes the normal screen in which only the received image is shown (step 611).

During playback of the message from the recording medium 9, a one-touch key 70 is displayed below, for example, the sub screen 69 in which the image of the other party is shown as shown in FIG. 25 (b). To talk with the other party through TV telephone after viewing the message of FIG. 25 (b) (step 612), the user specifies the one-touch key 70 with a cursor, not shown (step 613). A call is originated to the other party (step 614). When the call terminates at the other party, a sub screen 71 of the user and a sub screen 72 of the other party are displayed on the display screen 2 as shown in FIG. 25 (c), upon which talk to the other party is enabled (step 615). This talk can be made through the microphone 61 and the speaker 62 of the remote controller 14 or the microphone 3 (FIG. 2) and the speakers 10 and 11 of the television receiver main 1.

In the television receiver main 1, necessary telephone numbers such as user's relatives are recorded with their codes. When called from one of these relatives, the telephone connection is established and the corresponding code also comes along with the call. Receiving the code, the television receiver main 1 records this code along with the message. When the one-touch key 10 is specified in the screen of FIG. 25 (c), the recorded code is read and a telephone number corresponding to this code is selected from those registered in the television receiver main to make a call to the other party. Thus, the other party can be automatically called by such a simple operation.

Figure 24:
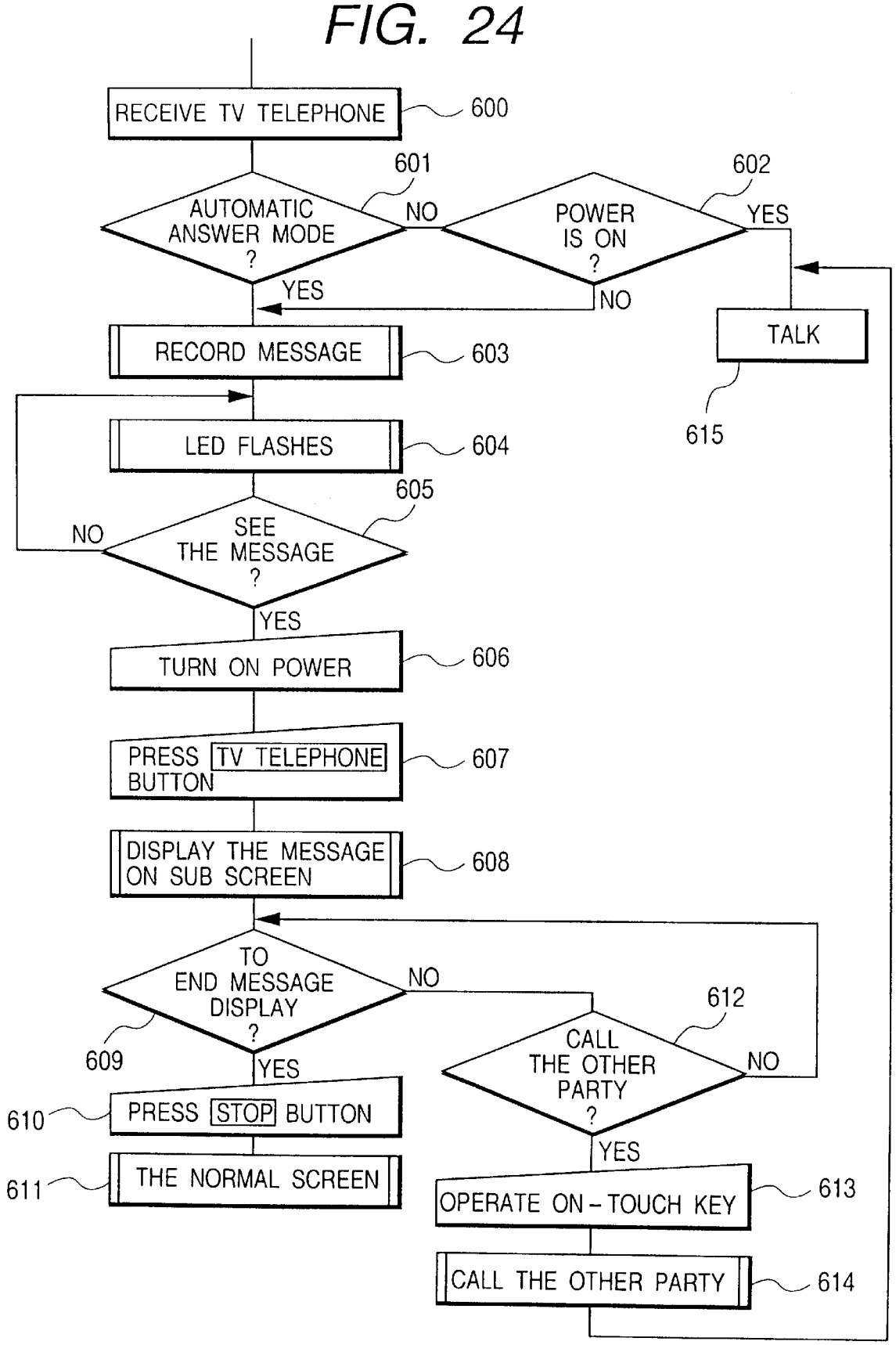
FIG. 24 is a flowchart indicating operations in TV telephone mode.

If, in FIG. 24, a call comes from the other party when the television receiver main 1 is not in the automatic answer mode (step 601) and the television receiver main 1 is in the power on state (step 602), operating the TV telephone button 52 of the remote controller 14 enables the talk with the other party (step 615) to display the screen shown in FIG. 25 (c). It is also possible that, if a call comes from the other party when the television receiver main 1 is in the automatic answer mode caused by the operation of the automatic answer button 56 of the remote controller 14 (step 601) and the television receiver main 1 is not in the power on state (step 602), operating the TV telephone button 52 when the call has come enables the talk with the other party (step 615) to provide the screen of FIG. 25 (c).

Thus, a message received in the TV telephone mode can be heard later.

It will be apparent that, in the above-mentioned TV telephone mode, the user can operate numeric buttons 58 of the remote controller 14 and enter the telephone number of the other party to call the same (at this moment, upon which the entered telephone number of the other party is displayed in the display window 57 of the remote controller 14). In the state of FIG. 25 (b), instead of the one-touch key 70, numeric keys 58 of the remote controller 14 may be operated to call the other party.

Although not shown in FIG. 25 (b), message input date and time may be displayed in the sub screen 69. For these message input date and time, the date information provided by the timer 8a (FIG. 3) is used.

In the above description, the other party is automatically called upon specifying the one-touch key 70. The embodiment may also be constituted such that, when the one-touch key 70 is specified, the telephone number of the other party is displayed in the display screen for viewing and the user enters the telephone number on the remote controller 14.

Figure 26:
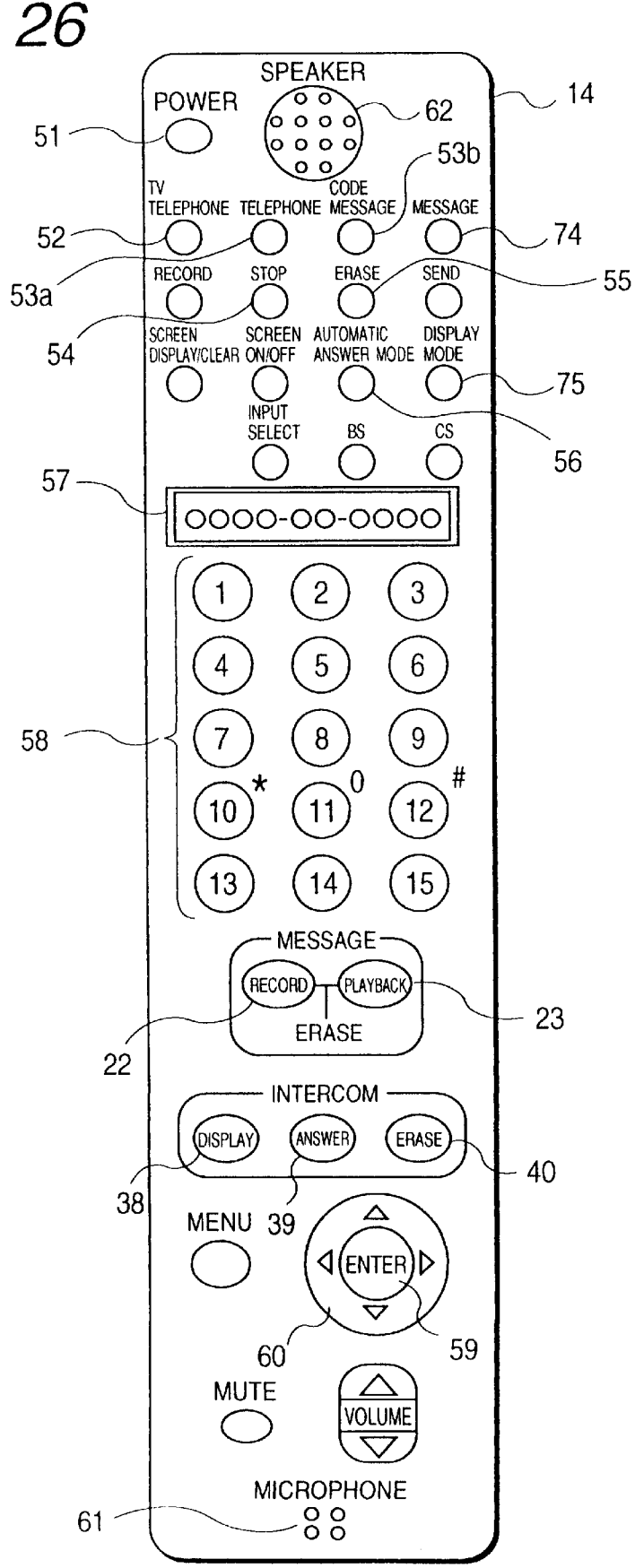
FIG. 26 is a top view illustrating a remote controller shared by all modes, practiced as one embodiment of the invention.

The above-mentioned modes can all be operated also by the common remote controller 14. FIG. 26 shows one example of the remote controller 14 used for such a purpose. In the figure, reference numeral 74 indicates a message button and reference numeral 75 indicates a display button. The operator buttons having generally the same functions as those of the buttons of FIGS. 26, 4, and 12 are assigned similar reference numerals.

In FIG. 26, to execute the message mode described with reference to FIGS. 5 through 10, the user need only operate the message button 74. This activates the record button 22 and playback button 23 dedicated to the message mode to enable message recording and playback. Voice is entered through the microphone 61.

In the intercom mode, as described with reference to FIGS. 13 through 19, information (a chime sound) coming from the intercom 15 (FIG. 3) activates the display button 38, answer button 39, and erase button 40 dedicated to the intercom mode to set the intercom mode, so that no special operator button for setting this mode is required.

In the code message mode described with reference to FIGS. 20 through 23, when listening to a received code message, the user operates the code message button 53b. As described before, when this code message button 53b is operated, the code message is reproduced from the recording medium 9 and displayed. When the stop button 54 is operated, the code message mode is stopped. When the erase button 55 is operated, the code message recorded in the recording medium 9 is erased. When transmitting a code message to the other party, the user operates the telephone button 53a and performs the button operation described before.

When executing the TV telephone mode described with reference to FIGS. 21, 24 and 25, the user operates the TV telephone button 66. As described before, when the TV telephone button 52 is operated, a TV telephone message recorded in the recording medium 9 is reproduced and displayed. When the stop button 54 is operated, these reproduction and display operations are stopped. When the erase button 55 is operated, the TV telephone message recorded in the recording medium 9 is erased. In this TV telephone mode, a telephone number entered by operating numeric buttons 58 is displayed in the display window 57. When the enter button 59 is operated, a call is made to the other party of the entered telephone number. When the TV telephone mode has come to an end, the telephone number in the display window 57 disappears.

In the above-mentioned embodiment, a message is reproduced and displayed for each of the above-mentioned modes. This embodiment may also be constituted such that messages are reproduced and displayed in the order in which they were entered in the television receiver main 1 for example regardless of the modes. Such reproduction and display can be performed by operating the display mode button 75 for example in FIG. 26. Because, in each mode, each message is recorded in the recording medium 9 along with the input data and time information provided by the timer 8a (FIG. 3), when the display mode button 75 is operated, the messages are read from the recording medium 9 on the first-in, first-out basis according to the input date and time information.

FIG. 27 shows an example of the display screen to be provided in the above-mentioned case. In this display screen, three sub screens 76 through 78 are displayed. The sub screen 76 shows an image in the message mode, the sub screen 77 shows an image in the code message mode, and the sub screen 78 shows an image in the TV telephone mode. In each of the sub screens, the message input date and time are displayed and the text or icon for indicating the mode of the message is displayed.

To view any of these displayed messages, the user operates the cursor key 60 on the remote controller 14 of FIG. 26 to move the frame-shaped cursor to the desired sub screen and operates the enter button 59 in generally the same manner as described before.

Each of the sub screens 76 through 78 shows the number of messages stored in the recording medium 9 and the order of storage in the manner of a fraction. A triangular marker 80 is also displayed to indicate there is another message. To view a message other than those displayed, the user operates the cursor key 60 to move a cursor 79 to top or bottom of the display screen 2, upon which a new message is scrolled down or up.

As described and according to the present invention, a variety of message transmission methods become available, the capability of the television receiver as a home communication device is significantly enhanced, and, consequently, usefulness of the television receiver is increased.

While the preferred embodiments of the present invention have been described using specific terms, such description is for illustrative purposes only, and it is to be understood that changes and variations may be made without departing from the spirit or scope of the appended claims.

What is claimed is:

1. A television receiver that receives a television signal to display a television image on screen, comprising:
   memory means;
   a microphone through which voice information is entered externally;
   writing means for writing at least one piece of the voice information entered through said microphone and additional information associated with said at least one piece of voice information into said memory means; and
   display means for reproducing said at least one piece of voice information stored in said memory means and outputting the reproduced voice information through a speaker and displaying said additional information associated with said at least one piece of voice information onto said screen.

2. The television receiver according to claim 1, wherein said additional information associated with said voice information is associated with a person who entered said voice information, said additional information being displayed on said screen as an icon.

3. The television receiver according to claim 1, wherein said additional information associated with said voice information is a time information indicating a time at which said voice information was entered.

4. The television receiver according to claim 1, wherein said at least one piece of voice information stored in said memory means is reproduced in response to an instruction performed on said icon displayed on said screen.

5. The television receiver according to claim 4, wherein said icon is displayed in plural corresponding to a plurality of pieces of voice information stored in said memory means, specification of one of said plurality of icons reproducing corresponding information.

6. The television receiver according to claim 1, wherein the voice information stored in said memory means gets started in the reproduction based an externally specified reproduction start time.

7. The television receiver according to claim 1 further comprising:
   a display section for externally indicating that the voice information is stored in said memory means.

8. A television receiver that receives a television signal to display a television image on screen, comprising:
   memory means;
   a microphone through which voice information is externally entered;
   a video camera through which image information is externally entered;
   writing means for writing said voice information entered through said microphone and said image information entered through said video camera at the time said voice information is entered to said memory means in an interrelated manner; and
   display means for reproducing said voice information stored in said memory means according to an externally given instruction to output the reproduced voice signal through a speaker and reproducing said image information corresponding to said voice information, stored in said memory means, to display the reproduced image information onto screen.

9. The television receiver according to claim 8, wherein said image information to be displayed at reproduction of said voice information is a still picture.

10. A television receiver that receives a television signal to display a television image on screen along with an accompanying audio signal to be supplied to a speaker, comprising:
    a display controller for displaying a video image, coming from a video camera installed on an intercommunicating system, in one area on a screen on which said television image continues to be displayed, in response to an operation performed on a calling switch installed on the intercommunicating system; and
    a voice output controller for outputting voice information, coming from a microphone installed on the intercommunicating system, to the speaker of the television receiver, in response to an operation performed on the calling switch;
    wherein, when an operation of said calling switch is performed, said voice output controller performs a control operation in such a way that the volume of the audio signal accompanying the television signal output from said speaker is set to be lower than the audio volume which was being output before said calling switch was operated.

11. The television receiver according to claim 10, wherein said television receiver has a left-hand speaker and a right-hand speaker, said voice information coming from said microphone installed on said intercommunicating system is outputted to one of said left-hand speaker and said right-hand speaker, and an audio signal carried by said television signal is outputted from the other speaker.

12. The television receiver according to claim 11, wherein the voice information outputted from one of said left-hand speaker and said right-hand speaker is larger in volume than the audio signal carried by said television signal outputted from the other speaker.

13. The television receiver according to claim 11, wherein a chime sound generated by pressing the calling switch installed on said intercommunicating system is outputted at least one of said left-hand speaker and said right-hand speaker.

14. The television receiver according to claim 10, further comprising:
    a memory; and
    a memory controller for storing the video image coming from said video camera and the voice information coming from said microphone in said memory during a predetermined period of time since the operation of said calling switch has been carried out.

15. The television receiver according to claim 14, wherein, if said voice information and said image information are each stored in said memory means in plurality of pieces, at least two of the plurality of pieces of image information are displayed as still-picture sub screens in an area on said screen and, when one of said two sub screens is selected according to an externally given instruction, the selected sub screen is animated and the voice information corresponding to the animated sub screen is reproduced to be outputted from a speaker.

* * * * *